United States Patent
Miyazaki et al.

(10) Patent No.: US 8,896,576 B2
(45) Date of Patent: Nov. 25, 2014

(54) TOUCH PANEL, LIQUID CRYSTAL PANEL, LIQUID CRYSTAL DISPLAY DEVICE, AND TOUCH PANEL-INTEGRATED LIQUID CRYSTAL DISPLAY DEVICE

(75) Inventors: Shinichi Miyazaki, Osaka (JP); Hiroshi Hamada, Osaka (JP); Mikihiro Noma, Osaka (JP); Kengo Takahama, Osaka (JP); Masakazu Wada, Osaka (JP); Norikazu Hohshi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 639 days.

(21) Appl. No.: 13/147,836

(22) PCT Filed: Mar. 12, 2010

(86) PCT No.: PCT/JP2010/001802
§ 371 (c)(1),
(2), (4) Date: Aug. 4, 2011

(87) PCT Pub. No.: WO2010/137219
PCT Pub. Date: Dec. 2, 2010

(65) Prior Publication Data
US 2011/0291993 A1  Dec. 1, 2011

(30) Foreign Application Priority Data

May 28, 2009  (JP) ................... 2009-129526

(51) Int. Cl.
G06F 3/042  (2006.01)
G06F 3/041  (2006.01)

(52) U.S. Cl.
CPC ..................... G06F 3/042 (2013.01)
USPC ......................... 345/175; 345/173

(58) Field of Classification Search
USPC ......................................... 345/175
See application file for complete search history.

(56) References Cited

U.S. PATENT DOCUMENTS

| 6,891,677 | B2 * | 5/2005 | Nilsen et al. .................. 359/625 |
| 7,042,444 | B2 * | 5/2006 | Cok ............................. 345/173 |
| 7,053,967 | B2 * | 5/2006 | Abileah et al. .................. 349/12 |
| 2007/0273658 | A1 | 11/2007 | Yli-Nokari et al. |
| 2008/0007540 | A1 * | 1/2008 | Ostergaard ..................... 345/176 |

(Continued)

FOREIGN PATENT DOCUMENTS

| JP | 61-156425 A | 7/1986 |
| JP | 6-309100 A | 11/1994 |

(Continued)

*Primary Examiner* — Alexander S Beck
*Assistant Examiner* — Mihir Rayan
(74) *Attorney, Agent, or Firm* — Birch, Stewart, Kolasch & Birch, LLP

(57) ABSTRACT

A touch panel includes: an infrared light transmitting material through which infrared light is transmitted and which has a surface as a touch surface (20) touched by a detection subject; area sensors (3) including photo sensor elements (4) below a touch region, which is touched by the detection subject, of the infrared light transmitting material; and infrared light sources (1) provided outside the touch region, the infrared light sources (1) emitting infrared light along said surface of the infrared light transmitting material such that an entire circumference of the detection subject touching the touch surface (20) is irradiated with the infrared light, the touch panel detecting a position touched by the detection subject so that the photo sensor element (4) receives, among infrared light emitted by the infrared light sources (1) along said surface, infrared light reflected by the detection subject and transmitted through the infrared light transmitting material.

19 Claims, 10 Drawing Sheets

(56) References Cited

U.S. PATENT DOCUMENTS

| | | | |
|---|---|---|---|
| 2008/0121442 A1* | 5/2008 | Boer et al. | 178/18.09 |
| 2008/0159599 A1 | 7/2008 | Kajihara et al. | |
| 2008/0259051 A1 | 10/2008 | Ota | |
| 2009/0058832 A1* | 3/2009 | Newton | 345/175 |
| 2010/0097348 A1* | 4/2010 | Park et al. | 345/175 |
| 2011/0025646 A1* | 2/2011 | Wu et al. | 345/175 |

FOREIGN PATENT DOCUMENTS

| | | |
|---|---|---|
| JP | 2004-303172 A | 10/2004 |
| JP | 2005-135329 A | 5/2005 |
| JP | 2007-052497 A | 3/2007 |
| JP | 2007-183706 A | 7/2007 |
| JP | 2008-186374 A | 8/2008 |
| JP | 2008-224935 A | 9/2008 |
| WO | WO 2008/017077 A2 | 2/2008 |

* cited by examiner

DIRECTIVITY OF LED

DIRECTIVITY OF LED

TOUCH PANEL, LIQUID CRYSTAL PANEL, LIQUID CRYSTAL DISPLAY DEVICE, AND TOUCH PANEL-INTEGRATED LIQUID CRYSTAL DISPLAY DEVICE

TECHNICAL FIELD

The present invention relates to (i) a touch panel including a photo sensor element and detecting a position of an input which is externally made, (ii) a liquid crystal panel including the touch panel, and (iii) a liquid crystal display device including the touch panel.

BACKGROUND ART

Among display devices such as liquid crystal display devices, there have been developed a touch panel-integrated display device having a touch panel function capable of detecting a position of a panel surface which position is touched by a finger, an input pen, or the like.

Most of conventionally-used touch panel-integrated display devices employ (i) a resistance film type (i.e., a type according to which, in response to being pressed, an upper electrically-conductive substrate and a lower electrically-conductive substrate come in contact with each other, and an input position is detected based on this) or (ii) a capacitive type (i.e., a type according to which a change in capacitance in a touched position is detected and thus an input position is detected). However, such the display device needs, for example, a special panel for position detection. This increases the entire thickness of the device. Further, providing such the touch panel in a screen (display region) of the display device leads to a problem of impairing visibility.

Incidentally, Patent Literature 1 describes a touch sensor system by which a position of the tip of a finger touching a panel is detected by selecting a detection method depending on brightness of natural light as below: (i) If a photo sensor for finger detection provided in the panel detects natural light whose brightness is equal to or greater than a threshold value, a method (finger shadow model) for detecting the shadow of the finger which shadow is made by the natural light is selected. (ii) If natural light detected has brightness which is less than the threshold value, a method (finger cushion reflection model) for detecting light which is emitted from a backlight and reflected by the finger is selected.

Patent Literature 2 describes a touch input device including a display section having upper, lower, right, and left parts each including an array of light-emitting elements and an array of light-receiving elements, wherein an infrared ray is emitted in a direction parallel with a screen of the display section, and a position of the screen of the display section to which position an input is made by a finger or the like is detected based on blocking of the light.

CITATION LIST

Patent Literature 1

Japanese Patent Application Publication, Tokukai, No. 2007-183706 A (Publication Date: Jul. 19, 2007)

Patent Literature 2

Japanese Patent Application Publication, Tokukaisho, No. 61-156425 A (Publication Date: Jul. 16, 1986)

SUMMARY OF INVENTION

Technical Problem

However, according to the above-described Patent Literature 1, when brightness of natural light is equal to the threshold value, i.e., at a boundary point at which the finger shadow model and the finger cushion reflection model are switched one from another, it is impossible to detect the shadow of the finger or the light reflected by the finger, thereby failing to detect the input position. Namely, the method of Patent Literature 1 causes a dead zone in which an input position cannot be detected. Furthermore, under strong parallel light, (i) an image obtained in a touched state and (ii) an image obtained in a non-touched state are identical, and therefore it is impossible or difficult to determine whether or not the finger is touching the screen. Thus, it is impossible to detect the input position.

With the configuration for detecting light which is emitted by the backlight and is reflected by the finger as in Patent Literature 1, whether or not the screen is touched is determined by detecting, as a signal difference, a difference between (i) an intensity of reflected light in a part at which a touch surface is touched and (ii) an intensity of reflected light in a part at which the touch surface is not touched. However, under strong parallel light, (i) light emitted by the backlight and reflected by the finger cushion and (ii) ambient light reflected by a part other than the finger cushion are detected at the same time, for example. Therefore, under strong parallel light, no signal difference is generated between the touched state and the non-touched state, or if generated, such the signal difference is quite small.

Further, according to the above-described Patent Literature 2, the position of a single sensing subject is determined by (i) a light-receiving element located on an extension of a column direction of the sensing subject and (ii) a light-receiving element located on an extension of a row direction of the sensing subject. Therefore, for example, assume a case where (i) in a single column, two positions are touched, and (ii) in a row in which any of the two positions exits, another position is touched. In such a case, the touch made by a sensing subject with respect to the any of the two positions in the intersection of the above column and the above row cannot be detected. Thus, according to the configuration in which blocking of light emitted by a light-emitting element is detected by a light-receiving element provided so as to face the light-emitting element, such a case occurs where an input position cannot be identified. Thus, this configuration cannot detect three or more input positions at once.

The present invention was made in view of the foregoing problems, and an object of the present invention is to provide a touch panel which is capable of detecting an input position with higher accuracy under a broader range of environmental illuminance and which is capable of detecting three or more input positions at once.

Solution to Problem

In order to attain the above object, a touch panel of the present invention includes: an infrared light transmitting material through which infrared light is transmitted and which has a surface being used as a touch surface, the touch surface being touched by a detection subject; infrared light sensors including a plurality of infrared light receiving elements provided below a touch region of the infrared light transmitting material, the touch region being touched by the detection subject; and a plurality of infrared light sources provided in an outside of the touch region of the infrared light transmitting material, the plurality of infrared light sources being configured to emit infrared light along said surface of the infrared light transmitting material such that an entire circumference of the detection subject touching the touch surface is irradiated with the infrared light, the touch panel detecting a position touched by the detection subject in such a manner that at least one of the infrared light sensors receives, among infrared light emitted by the infrared light sources along said surface of the infrared light transmitting material, infrared light which is reflected by the detection subject and is transmitted through the infrared light transmitting material.

According to the above configuration, infrared light emitted from the outside of the touch region to a space above the touch surface so as to be in parallel with the touch surface is reflected by the detection subject so that a path of the infrared light is changed. Then, the infrared light is received by at least one of the infrared light receiving elements provided below the infrared light transmitting material. Accordingly, in a case where the detection subject is touching the touch surface, (i) a part touched by the detection subject is shielded from the infrared light so as to be in a dark state and (ii) the surroundings of the touched part are in a light state due to reflection light reflected by the detection subject, regardless of brightness of natural light (environmental illuminance).

As a result, it is possible to obtain a characteristic loop-like image in which (i) the part touched by the detection subject is dark and (ii) the surroundings of the touched part are light. This makes it easier to distinguish between a touched state and a non-touched state even under strong parallel light. Further, since the characteristic loop-like image is obtained, it is easier to identify, e.g., a center position of the detection subject. This makes it possible to detect the touched position with high accuracy. Furthermore, such the image can be obtained even by a light touch made with respect to the touch surface. Therefore, even with a quite light touch which is a so-called "feather touch", it is possible to clearly distinguish between a touched state and a non-touched state. This makes it possible to detect the touched position with high accuracy.

Further, the above configuration does not need to change a detection method according to brightness of natural light (environmental illuminance), unlike the conventional technique. Thus, the above configuration does not cause a dead zone in which an input position cannot be detected, unlike Patent Literature 1.

Therefore, according to the above configuration, it is possible to detect a touched position under a broad range of environmental illuminance.

Furthermore, according to the above configuration, the infrared light sensors each including the infrared light receiving element are provided below the touch region. This makes it possible to detect three or more touched positions at once.

Advantageous Effects of Invention

As described above, a touch panel, a liquid crystal panel, a liquid crystal display device, and a touch panel-integrated liquid crystal display device of the present invention each includes: an infrared light transmitting material through which infrared light is transmitted and which has a surface being used as a touch surface, the touch surface being touched by a detection subject; infrared light sensors including a plurality of infrared light receiving elements provided below a touch region of the infrared light transmitting material, the touch region being touched by the detection subject; and a plurality of infrared light sources provided in an outside of the touch region of the infrared light transmitting material, the plurality of infrared light sources being configured to emit infrared light along said surface of the infrared light transmitting material such that an entire circumference of the detection subject touching the touch surface is irradiated with the infrared light, the touch panel detecting a position touched by the detection subject in such a manner that at least one of the infrared light sensors receives, among infrared light emitted by the infrared light sources along said surface of the infrared light transmitting material, infrared light which is reflected by the detection subject and is transmitted through the infrared light transmitting material. Therefore, each of the touch panel, the liquid crystal panel, the liquid crystal display device, and the touch panel-integrated liquid crystal display device of the present invention is capable of (i) detecting an input position with higher accuracy under a broader range of environmental illuminance and (ii) detecting three or more input positions at once.

Additional objects, features, and strengths of the present invention will be made clear by the description below. Further, the advantages of the present invention will be evident from the following explanation in reference to the drawings.

Figure 9:
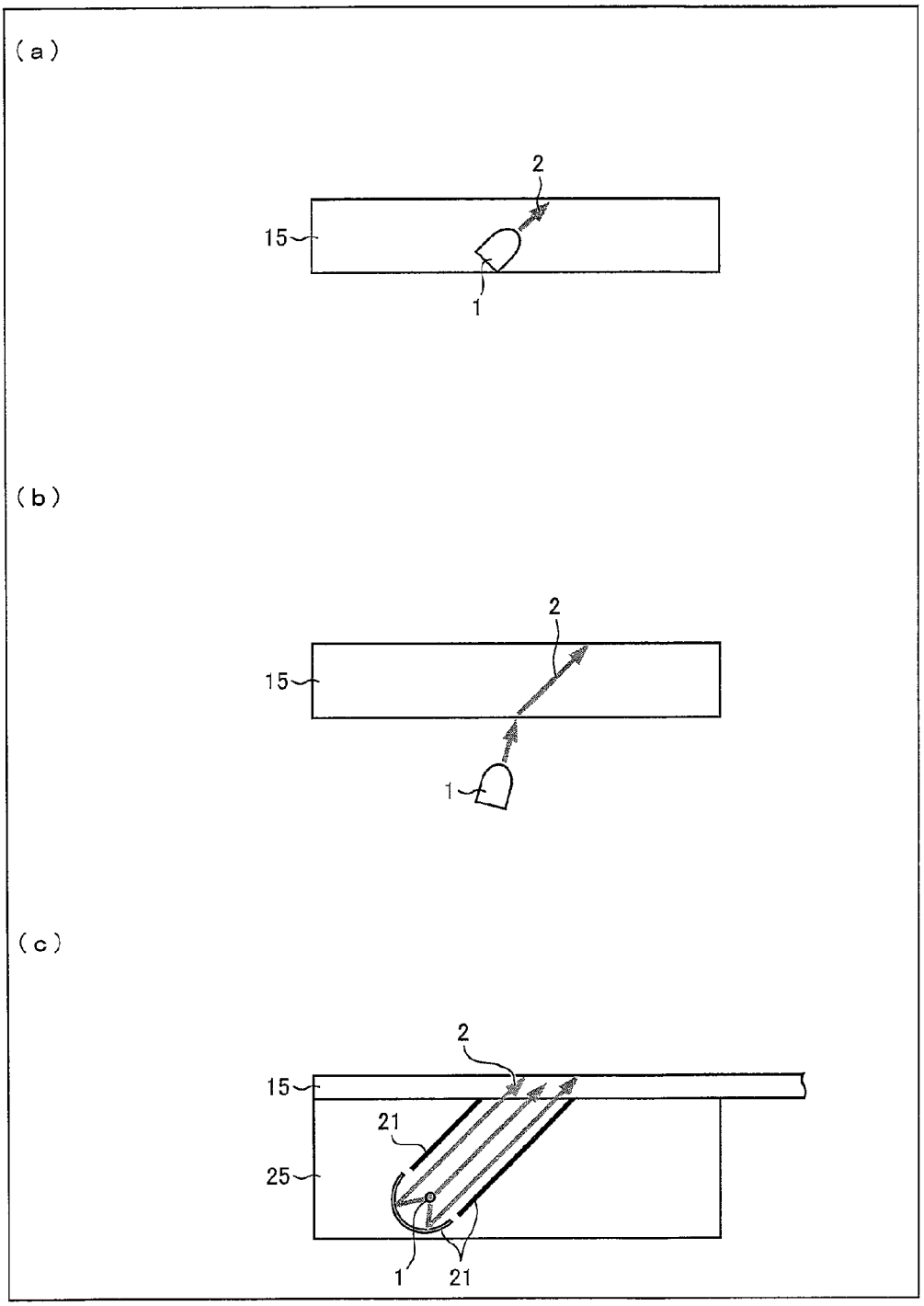

(a) through (c) of FIG. 9 are views illustrating examples where a positional relationship between a protection plate and an infrared light source of the another embodiment of the present invention is modified.

Figure 10:
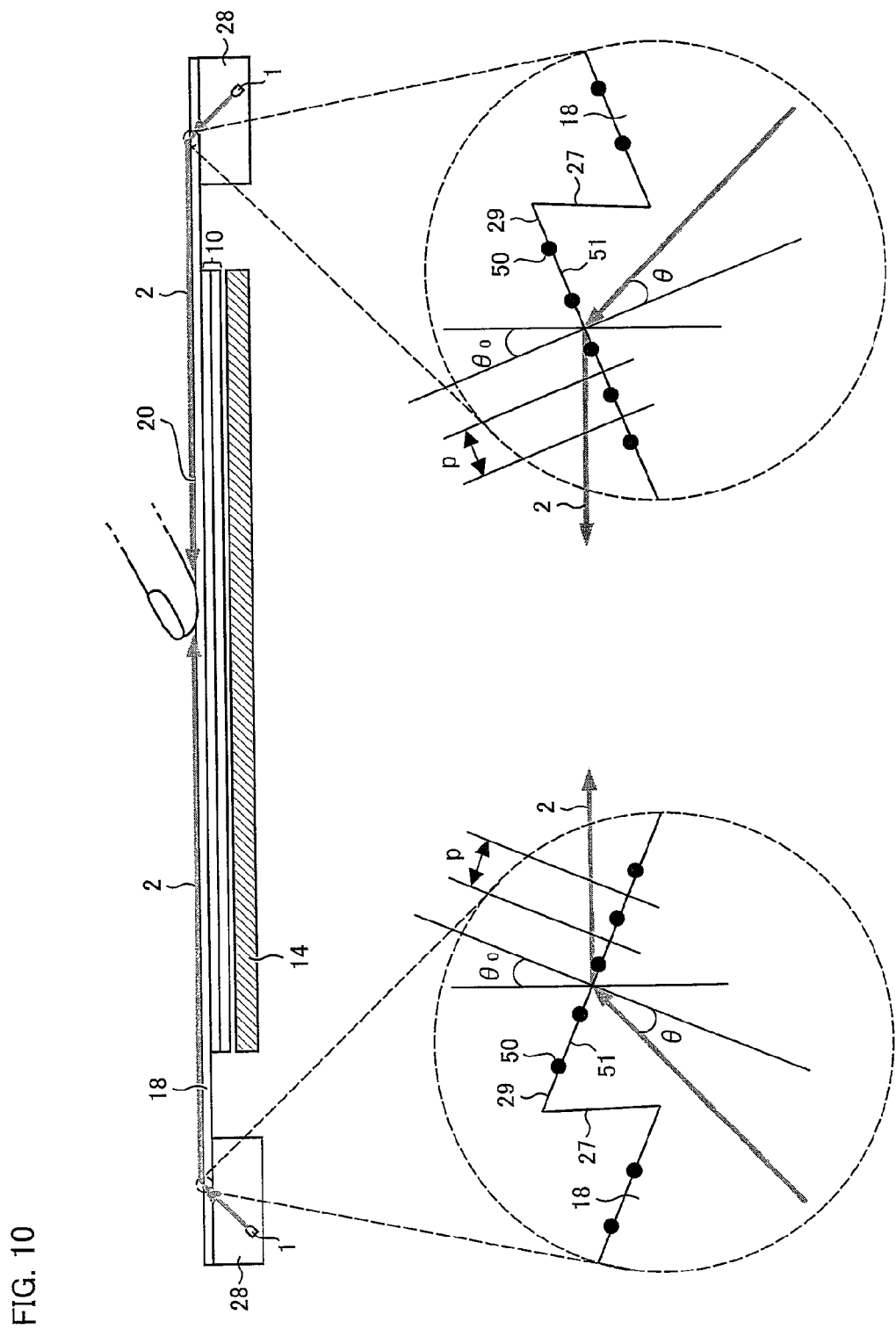

FIG. 10 is a cross-section view schematically illustrating a configuration of a liquid crystal display device of further another embodiment of the present invention.

Figure 11:
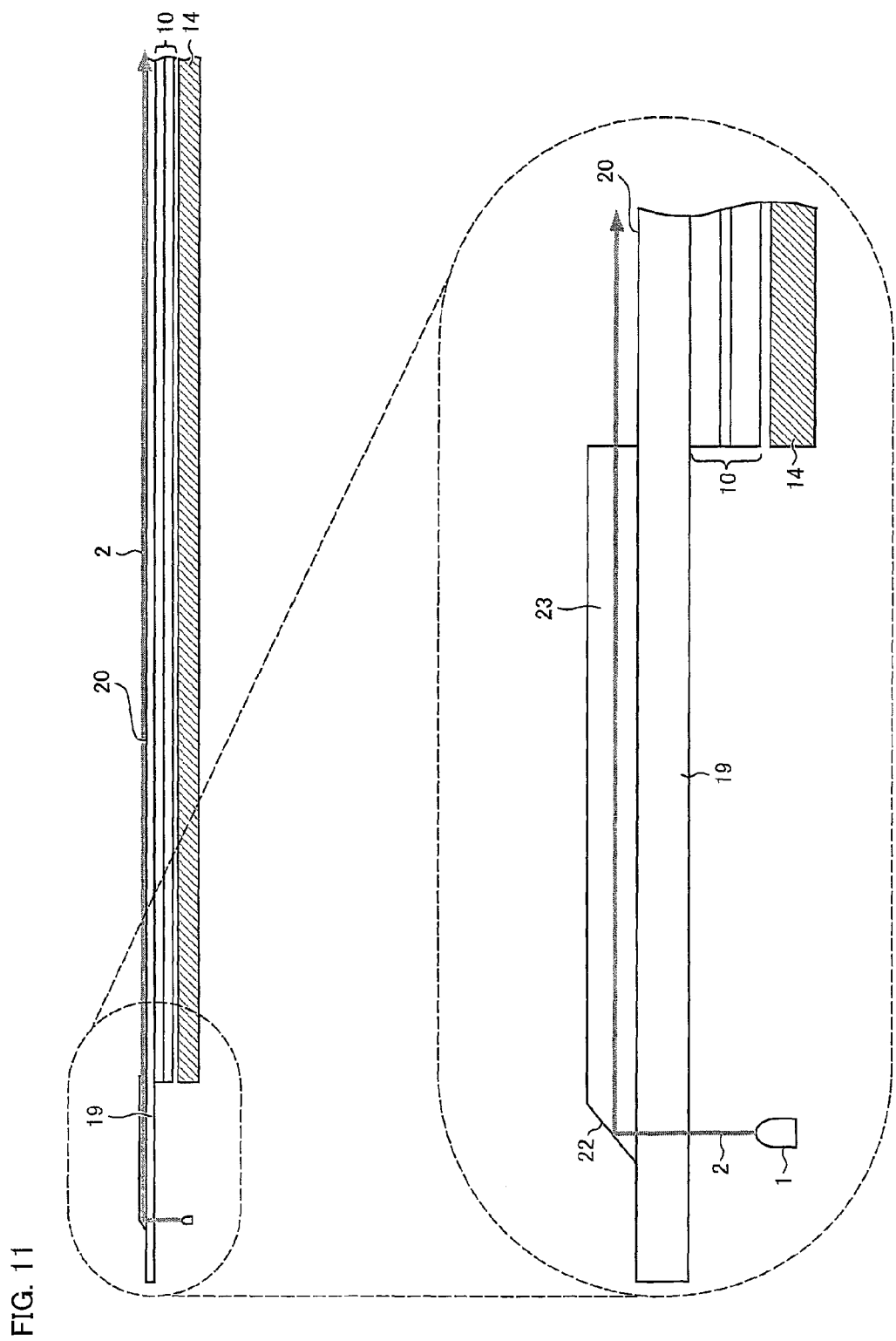

FIG. 11 is a cross-section view schematically illustrating a configuration of a main part of a liquid crystal display device of still further another embodiment of the present invention.

Figure 12:
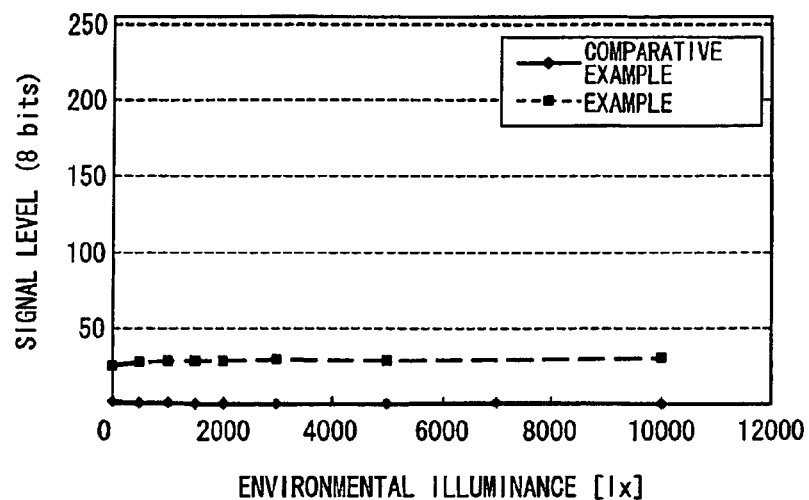

FIG. 12 is a graph showing differences between (i) signal levels observed when a detection subject surface was touched by a detection subject and (ii) signal levels observed when the detection target surface was not touched by the detection subject, which differences were observed under different environmental illuminances according to an Example of the present invention.

Figure 13:
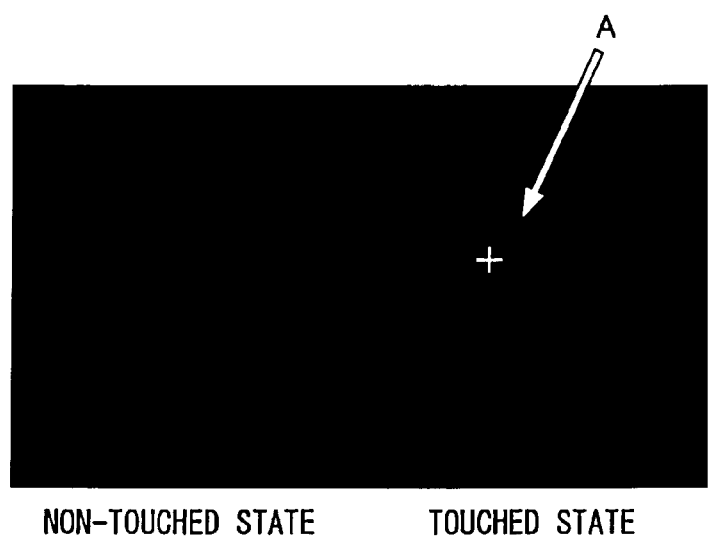

FIG. 13 is a view showing images obtained with a touch panel of the Example of the present invention.

Figure 14:
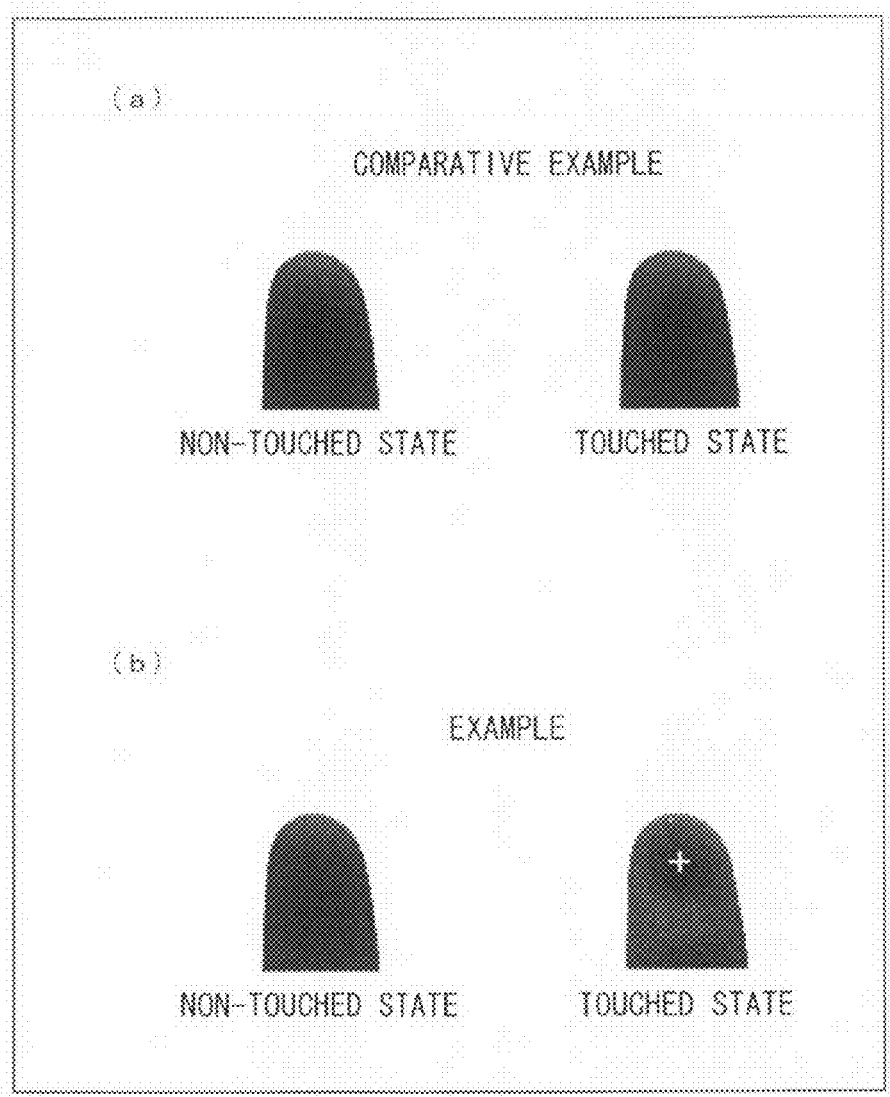

(a) and (b) of FIG. 14 are views showing images of a detection subject which images were obtained under parallel light according to the Example of the present invention.

DESCRIPTION OF EMBODIMENTS

Embodiment 1

The following will describe one embodiment of the present invention with reference to FIGS. 1 through 7. Note that the present invention is not limited to this.

The present embodiment deals with a touch panel-integrated liquid crystal display device.

Figure 1:
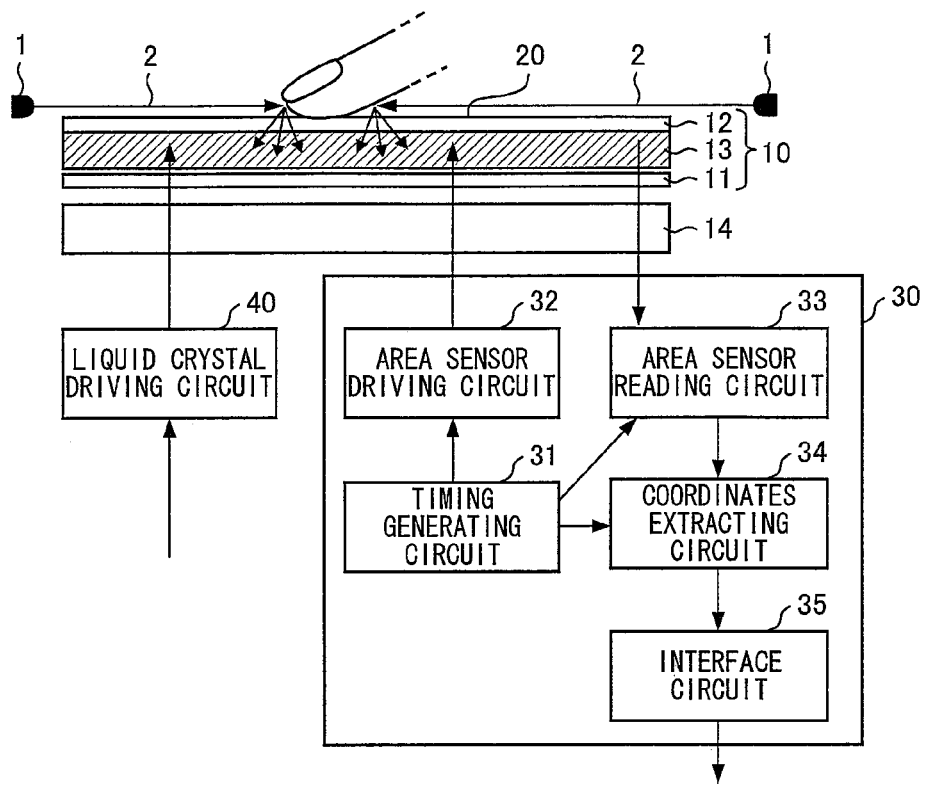
FIG. 1 is a cross-section view schematically illustrating a configuration of a liquid crystal display device of an embodiment of the present invention.
Figure 2:
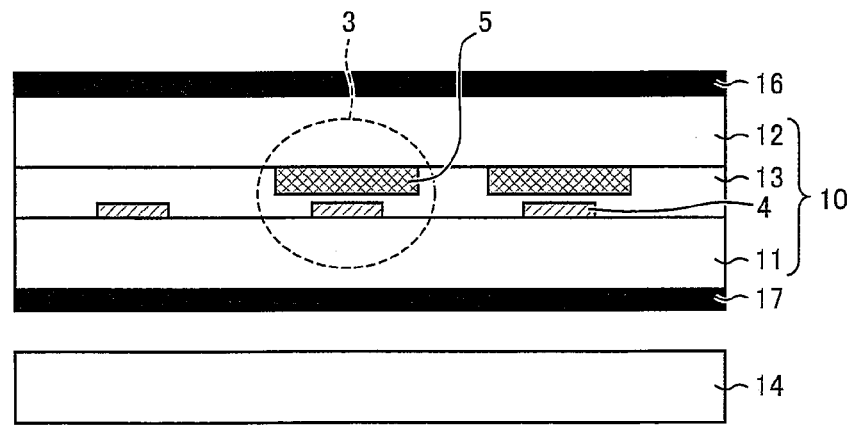
FIG. 2 is a cross-section view schematically illustrating a configuration of a main part of the liquid crystal display device shown in FIG. 1.
Figure 3:
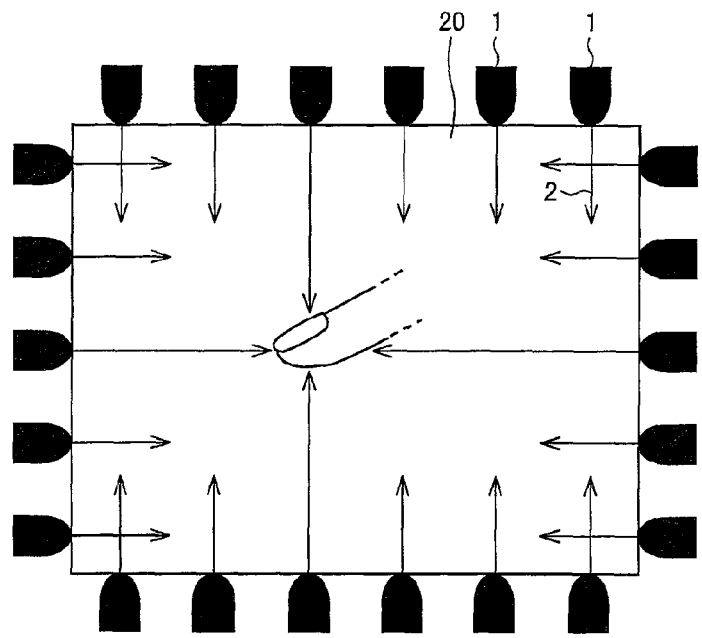
FIG. 3 is a plan view schematically illustrating a configuration of a main part of the liquid crystal display device shown in FIG. 1.

First, the following will describe a configuration of a liquid crystal display device of the present embodiment with reference to FIGS. 1 through 3. FIG. 1 is a cross-section view schematically illustrating a configuration of a liquid crystal display device of an embodiment of the present invention. FIG. 2 is a cross-section view schematically illustrating a configuration of a main part of the liquid crystal display device shown in FIG. 1. FIG. 3 is a plan view schematically illustrating a configuration of a main part of the liquid crystal display device shown in FIG. 1.

The liquid crystal display device of the present embodiment includes a liquid crystal panel 10 including a region where a liquid crystal image is displayed, which region serves as a touch region being to be touched by a detection subject. The liquid crystal display device has a touch panel function for detecting a position touched by a detection subject in such a manner that a photo sensor element (infrared ray receiving element) 4 provided for each pixel detects infrared light reflected by the detection subject such as a finger or an input pen touching a touch surface 20, which is a surface of the touch region. Thus, since the present embodiment detects infrared light reflected by the detection subject, the detection subject only needs to be the one which reflects infrared light.

As shown in FIG. 1, the liquid crystal display device of the present embodiment includes infrared light sources 1, the liquid crystal panel 10, and a backlight 14.

Each of the infrared light sources 1 is provided in the outside of the touch region of the liquid crystal panel 10, and emits infrared light which is indicated by a light path 2. The infrared light source 1 only needs to be the one which emits infrared light, and may be publicly-known one. The infrared light source 1 can be, for example, an infrared LED. Note that the infrared light is preferably the one having high directivity in a z-direction (i.e., a direction perpendicular to the touch surface 20).

As shown in FIG. 3, according to the present embodiment, a plurality of infrared light sources 1 are provided in the outside of the touch surface 20, which is the surface of the touch region of the liquid crystal panel 10, in such a manner that the infrared light sources 1 are arranged in four sides of the touch region along sides of the touch surface 20 so as to surround the periphery of the touch region, i.e., to surround the touch region.

With this, the infrared light sources 1 emit infrared light uniformly so as to cover the touch region. Consequently, the infrared light is emitted to the entire circumference of the detection subject touching the touch surface 20. Further, according to the present embodiment, as shown in FIG. 1, the infrared light sources 1 directly emit infrared light in a space above the touch surface 20 along the touch surface 20 so as to be in parallel with the touch surface 20.

As shown in FIG. 2, the liquid crystal panel 10 includes (i) an active matrix substrate 11 including a large number of pixels arranged in a matrix, (ii) a counter substrate 12 (infrared light transmitting material) provided so as to face the active matrix substrate 11, and (iii) a liquid crystal layer 13 which is provided between these two substrates and serves as a display medium. Note that, in the present embodiment, a display mode of the liquid crystal panel 10 is not particularly limited, and may be any display mode such as TN mode, IPS mode, or VA mode. The liquid crystal panel 10 includes, in its inside, area sensors (infrared light sensors) 3 each including a photo sensor element 4 for sensing infrared light (i.e., for receiving light).

Further, as shown in FIG. 2, in the outside of the liquid crystal panel 10, a front polarizing plate 16 (infrared light transmitting material) and a rear polarizing plate 17 are provided such that the liquid crystal panel 10 is sandwiched by the front polarizing plate 16 and the rear polarizing plate 17. Concretely, the rear polarizing plate 17 is provided on a first side of the active matrix substrate 11 which is opposite to a second side of the active matrix substrate 11 facing the counter substrate 12, whereas the front polarizing plate 16 is provided on a first side of the counter substrate 12 which is opposite to a second side of the counter substrate 12 facing the active matrix substrate 11.

As described previously, the surface of the liquid crystal panel 10 on which surface a liquid crystal image is displayed serves as the touch surface 20. The counter substrate 12 and the front polarizing plate 16 are used as the infrared light transmitting material, which is used as the touch surface 20. Thus, a surface of the front polarizing plate 16 serves as the touch surface 20, and infrared light is emitted along the touch surface 20. Further, infrared light reflected by the detection subject is transmitted through the counter substrate 12 and the front polarizing plate 16.

Note that, on the front polarizing plate 16, a protection plate or the like (not illustrated) made of a member through which infrared light is transmitted may be further provided. In this case, a surface of the protection plate serves as the touch surface 20.

Further, the active matrix substrate 11 is provided with, e.g., (i) TFTs (not illustrated), each of which serves as a switching element for driving a respective pixel, (ii) an alignment film (not illustrated), and (iii) the photo sensor elements 4. The TFTs are provided with a plurality of data signal lines and a plurality of gate signal lines arranged so that they intersect each other. Further, pixel electrodes are provided in the vicinity of the respective intersections via the TFTs. The photo sensor elements 4 are provided in respective pixel regions, and are arranged so as to correspond to the arrangement of the pixels, vertically and horizontally in a matrix.

Each of the photo sensor elements 4 is made of a photodiode or a phototransistor. The photo sensor element 4 flows electric current corresponding to an intensity of received light, and detects an amount of the received light. The TFT and the photo sensor element 4 may the ones which are monolithically formed on the active matrix substrate 11 by substantially the same process. Namely, part of constituent members of the photo sensor element 4 may be formed concurrently with formation of part of constituent members of the TFT. Such a method for forming the photo sensor element 4 may be carried out in accordance with a conventionallyknown method for manufacturing a photo sensor element-integrated liquid crystal display device.

Note that each photo sensor element 4 may not necessarily be provided for one pixel. Instead, each photo sensor element 4 may be provided for any one of R, G, and B pixel electrodes constituting one pixel.

As described previously, the photo sensor elements 4 are provided on the active matrix substrate 11, which is a substrate provided on the backlight 14's side. Further, the surface of the front polarizing plate 16 is used as the touch surface 20. Therefore, used as the counter substrate 12 is a substrate made of a material through which not only visible light but also infrared light is transmitted. Also, used as the front polarizing plate 16 is a polarizing plate made of such the material. Note that, as each of the counter substrate 12 and the front polarizing plate 16, the conventional, generally-used one can be used without any modification.

The counter substrate 12 includes a color filter layer (not illustrated), a counter electrode (not illustrated), an alignment film (not illustrated), etc. The color filter layer includes (i) colored sections each having a respective one of red (R), green (G), and blue (B) and (ii) a black matrix. The color filter layer is provided with the colored sections of R, G, and B in such a manner that the colored sections face their respective pixel electrodes, so that a red pixel electrode, a green pixel electrode, and a blue pixel electrode are obtained. One pixel is constituted by three pixel electrodes including the pixel electrode of R, the pixel electrode of G, and the pixel electrode of B. Consequently, in the liquid crystal panel 10, a plurality of pixels are arranged vertically and horizontally in a matrix.

Further, the counter substrate 12 preferably includes, in positions corresponding to the respective photo sensor elements 4 in the active matrix substrate 11, optical filters 5 for blocking visible light. Namely, each of the area sensors 3 of the present embodiment includes the photo sensor element 4 and the optical filter 5. This makes it possible to block a visible light component among light components entering the photo sensor element 4.

Each of the optical filters 5 only needs to have a nature that blocks visible light (i.e., light having a wavelength of 780 nm or less) and allows infrared light to transmit therethrough. This makes it possible to block a visible light component among light components entering the photo sensor element 4. The optical filter 5 may be, for example, the one including a red color filter and a blue color filter which are laminated. In this case, the optical filter 5 may be incorporated into the color filter layer in the counter substrate 12. This makes it possible to form the color filter layer and the optical filter 5 in a single step, thereby enabling to reduce the size of the liquid crystal panel 10 and to manufacture the liquid crystal panel 10 at low cost. Further, the optical filter 5 may be, for example, the one which is formed by mixing red, green, and blue pigments. This makes it possible to block visible light sufficiently, and also to reduce the film thickness.

In the present embodiment, at least one of the photo sensor elements 4 in the area sensors 3 detects infrared light reflected by the detection subject on the touch surface 20. Consequently, the touch panel for detecting a position of an input which is externally made is realized. Further, if a finger, an input pen, or the like touches a specific position in the touch surface 20, the photo sensor element 4 can read that position, and can input information to the device or cause the device to execute a desired operation. Thus, the liquid crystal display device of the present embodiment can realize the touch panel function by the area sensors 3.

Further, the area sensors 3 may each include a photo sensor element for dark current compensation, which photo sensor element serves as a correction sensor for compensating for a change in detection characteristics of the photo sensor element 4, the change being caused by an external cause such as temperature.

Each of the front polarizing plate 16 and the rear polarizing plate 17 serves as a polarizer. For example, in a case where a liquid crystal material sealed in the liquid crystal layer is vertical alignment mode, the front polarizing plate 16 and the rear polarizing plate 17 are arranged so that their polarizing directions are in the crossed Nicoles state. As a result, a normally-black liquid crystal display device can be provided.

The backlight 14 is provided behind the liquid crystal panel 10, and emits light toward the liquid crystal panel 10.

Further, the liquid crystal display device of the present invention may be provided with, as optical compensation elements, a front wave plate (not illustrated) and a rear wave plate (not illustrated) which are provided outside the active matrix substrate 11 and outside the counter substrate 12, respectively.

FIG. 1 shows (i) a liquid crystal driving circuit 40 for carrying out display driving with respect to the liquid crystal panel 10 and (ii) an area sensor control section 30 for driving the area sensors 3. For the area sensor control section 30, an internal configuration thereof is also shown. Note that the liquid crystal driving circuit 40 of the present embodiment can employ a generally-used, publicly-known configuration.

As shown in FIG. 1, the area sensor control section includes a timing generating circuit 31, an area sensor driving circuit 32, an area sensor reading circuit 33, a coordinates extracting circuit 34, and an interface circuit 35.

The timing generating circuit 31 generates a timing signal for controlling operation of the circuits in a synchronized manner.

The area sensor driving circuit 32 supplies electric power for driving the photo sensor elements 4.

The area sensor reading circuit 33 receives light reception signals from the photo sensor elements 4 which flow electric current having different values depending on amounts of received light. Then, the area sensor reading circuit 33 finds the amounts of received light.

Based on the amounts of light received by the photo sensor elements 4 which amounts are found by the area sensor reading circuit 33, the coordinates extracting circuit 34 finds coordinates corresponding to the position of the finger touching the touch surface 20.

The interface circuit 35 outputs, to the outside of the liquid crystal display device, information (positional information) indicative of the coordinates corresponding to the position of the finger which coordinates are found by the coordinates extracting circuit 34. The liquid crystal display device is connected with a PC or the like via the interface circuit 35.

With the above-described configuration, in a case where the detection subject such as a finger or an input pen touches the touch surface 20, at least one of the photo sensor elements 4 in the area sensors 3 formed in the liquid crystal panel 10 detects infrared light reflected by the detection subject, so that the liquid crystal display device of the present embodiment can detect the input position.

As described above, according to the present embodiment, the input position is detected through use of infrared light emitted from the outside of the touch region of the liquid crystal panel 10 so as to be in parallel with the touch surface 20. This increases a difference between (i) a signal obtained in a case with a detection subject and (ii) a signal obtained in a case without a detection subject, thereby making it possible to detect the input position with high accuracy. Further, since the present embodiment uses infrared light, it is possible to carry out detection regardless of brightness of natural light (environmental illuminance). Furthermore, even under strong parallel light, it is possible to easily detect a feature of the detection subject. Therefore, according to the present embodiment, it is possible to detect an input position under a broader range of environmental illuminance. According to the present embodiment, under an environmental illuminance of at least 0 lux through 90,000 lux, detection can be carried out adequately.

Figure 4:
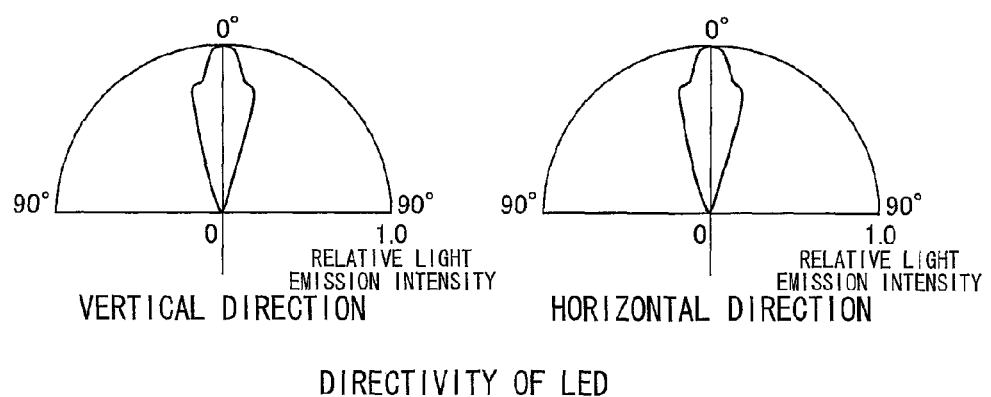
FIG. 4 is a view illustrating directivity (light distribution characteristics) of an infrared light source used in the embodiment of the present invention which directivity was observed at room temperature (25° C.).

An example of the infrared light source 1 which can be used in the present embodiment will be explained with reference to FIG. 4. FIG. 4 is a view illustrating directivity (light distribution characteristics) of the infrared light source 1 used in this embodiment of the present invention which directivity was observed at room temperature (25° C.).

In the present embodiment, light is propagated in an x-axis direction and in a y-axis direction along the surface of the touch region serving as the touch surface 20. Therefore, as shown in FIG. 4, as the infrared light source 1, such an infrared light source 1 can be used that is capable of emitting infrared light whose directivity (light distribution characteristics) is sharp in vertical (up-and-down) and horizontal directions. An example of such the infrared light source 1 may be a bullet-shaped (half spheroid-shaped) red LED. Further, as an infrared light source capable of emitting the above-described infrared light, TLN117(N) (manufactured by TOSHIBA) can be used, for example.

Figure 5:
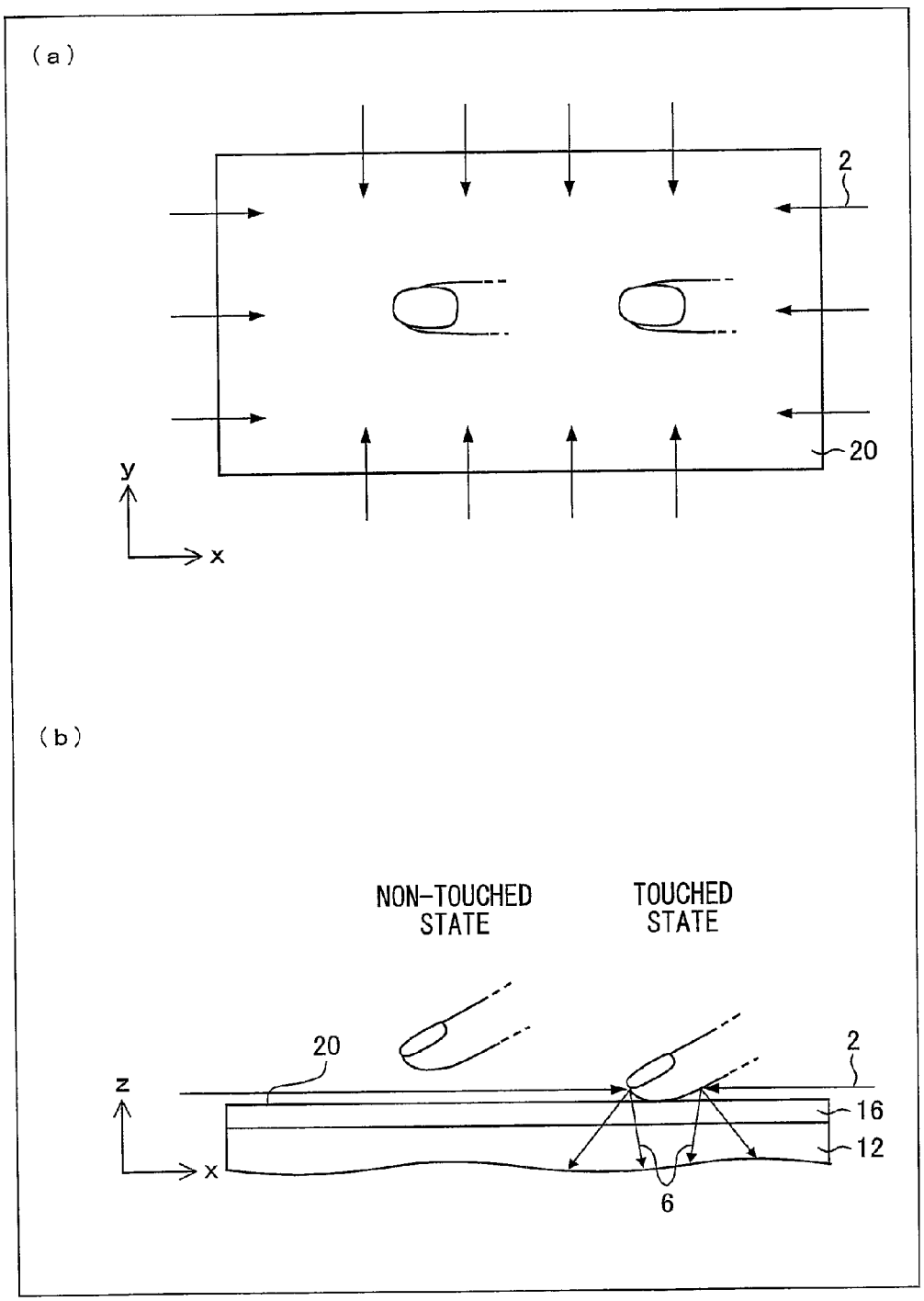
FIG. 5 is a view illustrating the principle of how the liquid crystal display device of the embodiment of the present invention detects a touched position. (a) of FIG. 5 is a plan view of a touch surface 20 of the liquid crystal display device of the embodiment of the present invention, which is viewed from the top. (b) of FIG. 5 is a cross-section of the liquid crystal display device of the embodiment of the present invention.

Next, with reference to (a) and (b) of FIG. 5, the following will describe how the position of the detection subject is detected according to the present embodiment. Each of (a) and (b) of FIG. 5 is a view illustrating the principle of how the liquid crystal display device of this embodiment of the present invention detects the touched position. (a) of FIG. 5 is a plan view of the touch surface 20 of the liquid crystal display device, which is viewed from the top. (b) of FIG. 5 is a cross-section view illustrating a main part of the liquid crystal display device.

As shown in (a) of FIG. 5, according to the present embodiment, infrared light is uniformly emitted from the periphery of the touch region along the surface of the touch surface 20 so that the infrared light covers the touch region.

The infrared light, which is emitted so as to be in parallel with the surface of the touch surface 20, comes into contact with the detection subject such as a finger touching the touch surface 20, and is reflected (scattered) thereby. As shown in (b) of FIG. 5, reflection light 6 reflected (scattered) by the detection subject is transmitted through the front polarizing plate 16 and the counter substrate 12, and then is detected by at least one of the photo sensor elements 4 in the area sensors 3 which are provided below the touch surface 20. Note that, in the present specification, the expression "below" the touch surface 20 means a region which is behind the touch surface 20, i.e., which is on the liquid crystal panel 10's side. At this time, based on a signal detected by the at least one of the photo sensor elements 4, the above-described area sensor control section 30 can find coordinates (x, y) corresponding to a position (touched position) of the detection subject on the touch surface 20.

According to the present embodiment, as shown in (a) of FIG. 5, infrared light is emitted from the four sides of the touch region toward a space above the touch surface 20 so as to be in parallel with the touch surface 20. Consequently, while the detection subject such as a finger is touching the touch surface 20, the infrared light is blocked at a position touched by the detection subject, and accordingly the touched position enters a dark state. On the other hand, the surroundings of the touched position enter a light state due to reflection light reflected by the detection subject. As a result, it is possible to obtain a characteristic loop-like image in which (i) the part touched by the detection subject such as a finger is dark and (ii) the surroundings of the touched part are light. As a result, it is possible to capture the contour (shape) of the detection subject from a lower side. Therefore, it is possible to identify, e.g., a center position of the finger. Further, since infrared light is emitted along the touch surface 20 so as to be in parallel with the touch surface 20, a difference between (i) a signal obtained in the touched state and (ii) a signal obtained in the non-touched state becomes great. Consequently, it is possible to recognize the difference clearly. This makes it possible to accurately detect a position of a detection subject, and also to detect a plurality of detection subjects at once.

Furthermore, even in a case where the detection subject such as a finger touches the touch surface 20 lightly, it is possible to detect such the light touch. Therefore, it is possible to operate the touch panel by a quite light touch such as a so-called feather touch.

For the example shown in FIG. 3, the case where the infrared light sources 1 are provided along the sides of the touch surface 20 has been described. However, the present embodiment is not limited to this.

Figure 6:
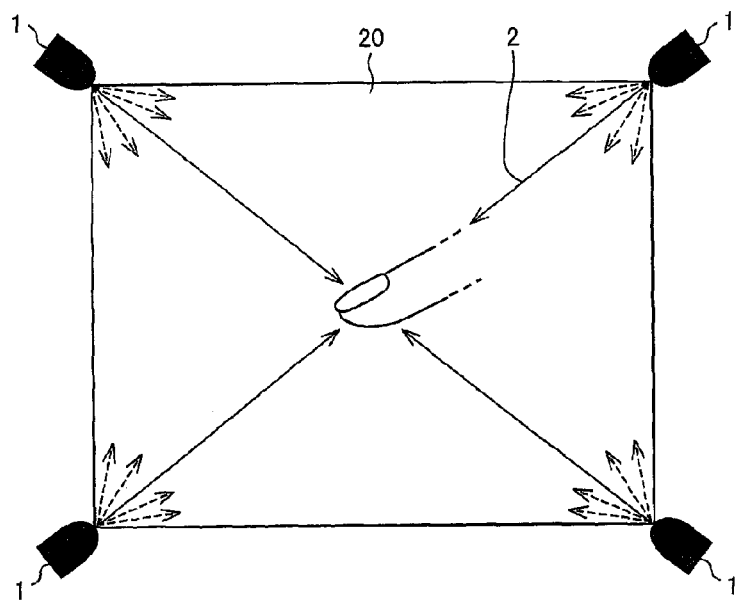
FIG. 6 is a plan view illustrating a modification of the liquid crystal display device of the embodiment of the present invention.

FIG. 6 is a plan view illustrating a modification of the liquid crystal display device of this embodiment of the present invention.

In a case where an infrared light source emitting light which travels radially in a plane parallel with a touch surface 20 is used as each of the infrared light sources 1, the infrared light sources 1 may be provided so as to face corner sections (corners) of the touch surface 20, as shown in FIG. 6. With this, infrared light is emitted to the touch surface 20 uniformly, so that the infrared light is emitted to the entire circumference of the detection subject touching the touch surface 20. In this case, in order to make it easier for infrared light of the infrared light source 1 to enter the touch surface 20, the corner of the touch surface 20 may be cut out by 45° with respect to the side of the touch surface 20 or by an angle orthogonal to a diagonal line of the touch surface 20. This makes it possible to reduce the number of infrared light sources 1 as compared with the configuration as shown in FIG. 3. This can reduce electric power consumption as compared with the liquid crystal display device configured as shown in FIG. 3.

FIG. 6 shows the configuration in which the infrared light sources 1 are provided in the four corners of the touch surface 20. However, the present embodiment is not limited to this. The infrared light sources 1 only need to be provided in at least two corners facing each other, and the infrared light sources 1 may be provided in only two or three corner sections.

As described previously, in the case where the infrared light source emitting light which travels radially in the plane parallel with the touch surface 20 is used as each of the infrared light sources 1, infrared light is emitted in a broad range toward the detection subject such as a finger, and light is emitted in an oblique direction. Therefore, even with a configuration in which the infrared light sources 1 are not provided in the four corner sections, it is possible to obtain a loop-shaped image indicative of the contour of the detection subject.

Similarly, by employing such the infrared light sources 1, it is possible to provide a configuration in which, for example, the infrared light source 1 are provided along at least two sides of the touch surface 20 facing each other or along three sides of the touch surface 20.

Figure 7:
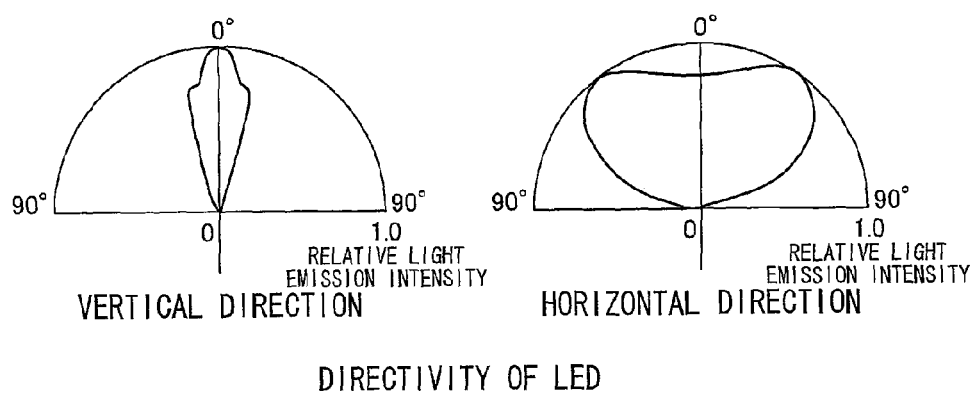
FIG. 7 is a view illustrating directivity (light distribution characteristics) of an infrared light source used in a modification of the embodiment of the present invention which directivity was observed at room temperature (25° C.).

The following will describe, with reference to FIG. 7, an example of infrared light sources 1 which can be used in such the modification. FIG. 7 is a view illustrating directivity (light distribution characteristics) of an infrared light source used in a modification of this embodiment of the present invention which directivity was observed at room temperature (25° C.).

According to the modification, as shown in FIG. 6, the infrared light sources 1 positioned in the corner sections of the touch surface 20 emit light to an entire space above the touch surface 20. Therefore, the modification can use an infrared light source 1 that emits light (i) spreading in its horizontal direction more than in its vertical direction and (ii) having different directivities (light distribution characteristics) between the horizontal direction and the vertical direction, as shown in FIG. 7. Examples of such the infrared light source 1 encompass a flat infrared LED which is thicker in its horizontal direction than its vertical direction (heightwise direction).

In a case where this modification uses the infrared light source 1 having the characteristics shown in FIG. 7, a permissible value by which the infrared light source 1 can rotate is preferably as follows: torsion angle <±20°. This makes it possible to secure uniformity of 50% or greater.

The present embodiment has described the touch panel-integrated liquid crystal display device. However, the present invention is not limited to this, and may be applied to a touch panel which is not integrated with a display device.

Embodiment 2

Figure 8:
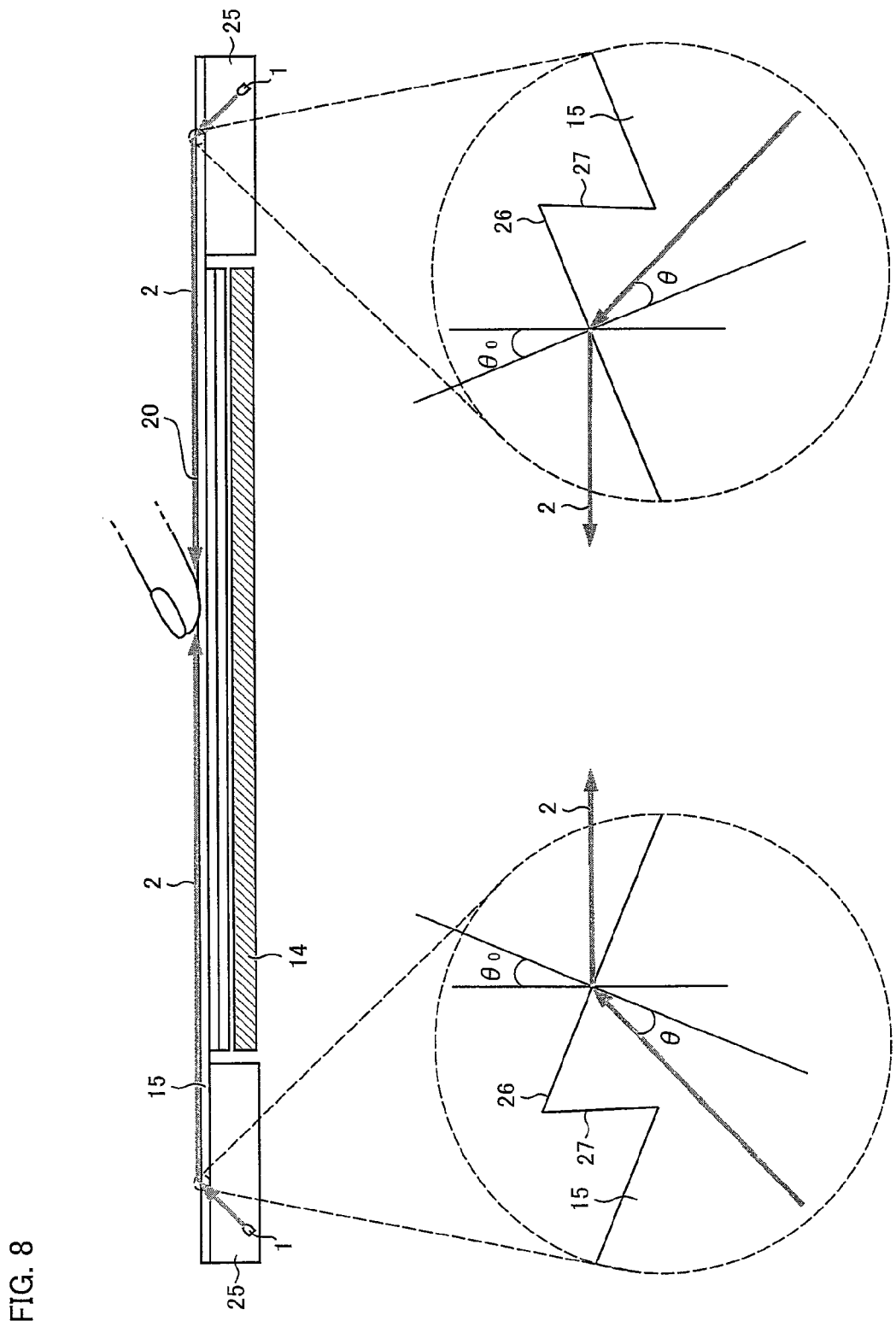
FIG. 8 is a cross-section view schematically illustrating a configuration of a liquid crystal display device of another embodiment of the present invention.

Next, the following will describe another embodiment of the present invention with reference to FIG. 8 and (a) through (c) of FIG. 9. Descriptions of the present embodiment deal with differences between the present embodiment and Embodiment 1. Further, constituent elements having the same functions as those explained in Embodiment 1 are given the same signs as Embodiment 1, and explanations thereof are omitted here.

FIG. 8 is a cross-section view schematically illustrating a configuration of a liquid crystal display device of the another embodiment of the present invention. Further, FIG. 8 shows enlarged views of parts surrounded by dotted lines.

The present embodiment differs from Embodiment 1 in the following points: A protection plate (infrared light transmitting material) 15 is provided so as to cover at least the liquid crystal panel 10, and infrared light is emitted along a surface of the protection plate 15 in a touch region.

As shown in FIG. 8, according to the present embodiment, the liquid crystal panel 10 has a surface covered with the protection plate 15. Therefore, the surface of the protection plate 15 is used as a touch surface 20.

The protection plate 15 is extended to an outside of the touch region of the liquid crystal panel 10. In a region which is on the side of a back surface of the protection plate 15 and is in an outside of the touch region, there provided a light source system including infrared light sources 1 and a housing section 25 for storing the infrared light sources. The housing section 25 is provided in the outside of the liquid crystal panel 10 so as to cover a side surface of the liquid crystal panel 10.

Each of the protection plate 15 and the housing section 25 only needs to be the one through which visible light and infrared light are transmitted. For example, such a protection plate can be used that is conventionally used as a transparent protection plate and is made of any of various kinds of transparent materials. Examples of such the transparent material encompass: transparent resin such as acrylic resin (e.g., PMMA: polymethylmethacrylate), polycarbonate resin, cyclic polyolefin resin, polyester resin (PET: polyethylene terephtalate), and fluororesin; glass; diamond; and quartz.

The protection plate 15 and the housing section 25 may be made of the same material or different materials. However, in view of adjustment of an angle of incidence, the protection plate 15 and the housing section 25 preferably have the same refractive index. Therefore, the protection plate 15 and the housing section 25 are preferably made of the same material.

The housing section 25 is hollow. The housing section 25 has an interior space in which the infrared light sources 1 are provided as described above. The housing section 25 may be configured such that a part thereof is opened, as long as the configuration allows the infrared light sources 1 to be fixed to the housing section 25.

The housing section 25 may be formed so as to be integrated with the protection plate 15. Alternatively, the housing section 25 may be fixed to the protection plate 15 via an adhesive or the like. In the case where the protection plate 15 and the housing section 25 are bonded to each other via an adhesive, it is preferable to use, as the adhesive, an adhesive having the same refractive index as those of the protection plate 15 and the housing section 25.

Infrared light emitted by each of the infrared light sources 1 is guided to an inner surface of the protection plate 15, which is extended to the outside of the touch region.

The surface of the protection plate 15 includes a surface of a part (extension section) which is extended to and provided in the outside of the touch region. The surface of the part is provided with an infrared ray emitting section having a sawtooth shape formed by (i) inclined surfaces 26 inclined with respect to a plane which is in parallel with the touch surface 20 and (ii) surfaces 27 perpendicular to the touch surface 20, the inclined surfaces 26 and the surfaces 27 being alternately arranged in series, as shown in the enlarged views in FIG. 8. Infrared light enters the inclined surface 26 of the infrared ray emitting section, and is refracted at an interface between the protection plate 15 and an air layer which interface is in the inclined surface 26.

At this time, the infrared light emitted from the inclined surface 26 of the protection plate 15 is refracted by a refractive index of the protection plate 15 with respect to the air. Thus, the protection plate 15 has a function by which the infrared light emitted by the infrared light source 1 is converted into light which is in parallel with the surface of the protection plate 15, i.e., the touch surface 20. Namely, according to the present embodiment, the infrared ray emitting section provided on the surface of the protection plate 15, particularly, the inclined surface 26 functions as a light path changing section.

An angle of incidence θ of infrared light with respect to the inclined surface 26 is preferably set so that infrared light transmitted through the protection plate 15 is refracted at the inclined surface 26 so that the infrared light is converted into light which is in parallel with the touch surface 20.

Preferably, the angle of incidence θ satisfies the following formula (1):

$$\theta = \arcsin[n \cdot \sin\{\arcsin(k) - \theta_0\}] \tag{1},$$

where, for example, n denotes a relative refractive index of the protection plate 15 with respect to an absolute refractive index of the air, $\theta_0$ denotes an angle by which the inclined surface 26 is inclined with respect to the touch surface 20, and k is 0.975 or greater and not greater than 1.

Note that k in the formula (1) is a value used to determine a range of the angle of incidence θ. In a case where k=1, a desired angle of incidence is obtained. By changing k in a range from 0.975 to 1, it is possible to adjust the angle of incidence θ in a range of ±4 degrees.

With this, infrared light entered the inclined surface 26 can be converted into light which is in parallel with the touch surface 20. This makes it possible to emit the infrared light to the touch surface 20 efficiently.

According to the present embodiment, as described previously, the protection plate 15 serves as the light path changing section. In the present embodiment, infrared light transmitted through the protection plate 15 is refracted at the inclined surface 26 of the protection plate 15. Therefore, according to the present embodiment, it is possible to emit the infrared light only to an interface between the protection plate 15 and an air layer. Consequently, according to the present embodiment, it is possible to increase a difference between (i) a signal obtained in a touched state and (ii) a signal obtained in a non-touched state. Also in the present embodiment, if the detection subject touches the touch surface 20, infrared light on the surface of the protection plate 15 is reflected or scattered. Therefore, by causing the photo sensor element 4 in the area sensor 3 to detect the infrared light thus reflected or scattered, it is possible to obtain an image in which only the surroundings of the touched region are light. This makes it possible to detect the position of the detection subject accurately.

Further, in the present embodiment, since the infrared light sources 1 are provided below the touch surface 20, it is possible to reduce the entire thickness of the liquid crystal display device. Further, since wiring of the infrared light source 1 does not protrude in a plane direction (horizontal direction), it is also possible to reduce the size of the liquid crystal display device.

As well as in Embodiment 1, in the present embodiment, the infrared light sources 1 may be provided along sides of the touch surface 20, or may be provided in corner sections of the touch surface 20.

The descriptions of the present embodiment has dealt with an example where, as shown in FIG. 8, (i) the housing section 25, which is hollow, is provided on the side of the back surface of the protection plate 15 so as to cover the side surface of the liquid crystal panel 10, and (ii) the infrared light source 1 is integrated in the housing section 25. However, the present embodiment is not limited to this. The housing section 25 is not necessarily essential. As long as the angle of incidence θ satisfies Formula (1), the infrared light source 1 may be provided so as to face the region which is on the side of the back surface of the protection plate 15 and is in the outside of the touch region.

(a) through (c) of FIG. 9 are views illustrating examples where a positional relationship between the protection plate 15 and the infrared light source 1 of the another embodiment of the present invention is modified.

In a modification shown in (a) of FIG. 9, instead of the hollow housing section 25 provided on the back surface of the extension section, which is in the outside of the touch region of the protection plate 15, a protection plate 15 itself is hollow. A surface of an extension section of the protection plate 15 is also provided with the same inclined surfaces 26 (not illustrated) as those shown in FIG. 8. An infrared light source 1 is provided inside the extension section of the protection plate 15.

In another modification shown in (b) of FIG. 9, instead of the infrared light source 1 provided in the housing section 25, an infrared light source 1 is provided below an extension section of a protection plate 15. The infrared light source 1 may be fixed to a back surface of the protection plate 15 by, e.g., a fixing member (not illustrated).

Providing the infrared light source 1 below the protection plate 15 makes it possible to reduce the entire thickness of the liquid crystal display device. Further, since wiring of the infrared light source 1 does not protrude in a plane direction (horizontal direction), it is also possible to reduce the size of the liquid crystal display device.

Further another modification shown in (c) of FIG. 9 is configured such that a housing section 25 includes, in its inside, reflection members 21 surrounding an infrared light source 1 and a light path 2 of infrared light. With this, infrared light emitted by the infrared light source 1 is reflected by the reflection member 21, and is guided to a surface of an extension section of a protection plate 15 via the housing section 25. Note that the surface of the extension section of the protection plate 15 is also provided with the same inclined surfaces 26 (not illustrated) as those in FIG. 8.

Each of the reflection members 21 only needs to be the one which reflects and guides infrared light, and a material thereof is not particularly limited. Considering reflection efficiency, light leakage prevention, etc., a metal material such as aluminum is suitably used as the reflection member 21, for example.

According to the further another modification shown in (c) of FIG. 9, it is possible to prevent infrared light emitted by the infrared light source 1 from being scattered to its surroundings, thereby enabling to efficiently emit the infrared light to a surface of a part of the protection plate 15 which part is extended to and provided in an outside of a touch region. Note that, in this case, each of the reflection members 21 is designed and positioned so that infrared light emitted by the infrared light source 1 enters the inclined surface 26 at an angle of incidence θ. According to the present modification, both of the protection plate 15 and the reflection member 21 serve as a light path changing section.

As well as in (a) of FIG. 9, in the further another modification, the infrared light source 1 may be provided inside the extension section of the protection plate 15. In this case, the reflection members 21 are also provided inside the protection plate 15. In this case, by providing the reflection members 21 so as to be adjacent to an inner surface of the protection plate 15 to which inner surface infrared light is guided, the reflection members 21 can reflect reflection light which is reflected by the inner surface of the protection plate 15 and is propagated through the protection plate 15. Thus, it is possible to allow the surface of the protection plate 15 to be efficiently irradiated with the infrared light emitted to the inner surface of the protection plate 15.

The position of the infrared light source 1, the materials of the protection plate 15 and the housing section 25, and combinations thereof are not limited to the above configuration, as long as the angle of incidence θ satisfies Formula (1).

Embodiment 3

Next, the following will describe further another embodiment of the present invention with reference to FIG. 10. Descriptions of the present embodiment deal with differences between (i) the present embodiment and (ii) Embodiments 1 and 2. Further, constituent elements having the same functions as those explained in Embodiments 1 and 2 are given the same signs as Embodiments 1 and 2, and explanations thereof are omitted here.

FIG. 10 is a cross-section view schematically illustrating a configuration of a liquid crystal display device of the further another embodiment of the present invention. Further, FIG. 10 shows enlarged views of parts surrounded by dotted lines.

The liquid crystal display device of the present embodiment has the same configuration as that of the liquid crystal display device of Embodiment 2, except that the liquid crystal display device of the present embodiment includes a protection plate 18 (infrared light transmitting material) shown in FIG. 10 instead of the protection plate 15 included in the liquid crystal display device of Embodiment 2.

Note that the protection plate 18 has a back surface provided with a housing section 28, which corresponds to the housing section 25 provided on the back surface of the protection plate 15. The housing section 28 has the same configuration as that of the housing section 25. Therefore, explanations thereof are omitted in the present embodiment.

As well as the protection plate 15, the protection plate 18 includes a part (extension section) extended to and provided in an outside of a touch region. As shown in the enlarged views in FIG. 10, a surface of the part is provided with an infrared ray emitting section having a sawtooth shape formed by (i) inclined surfaces 29 inclined with respect to a plane which is in parallel with a touch surface 20 and (ii) surfaces 27 perpendicular to the touch surface 20, the inclined surfaces 29 and the surfaces 27 being alternately arranged in series.

A difference between the protection plate 18 and the protection plate 15 is as follows: Each of the inclined surfaces 29 of the protection plate 18 is provided with a plurality of light-shielding layers 50 which are arranged regularly at a certain interval, each of the light-shielding layers 50 serving as a light-shielding section through which infrared light is not transmitted.

The light-shielding layers 50 can be provided by, for example, vapor deposition or printing of a light-shielding material on a surface of the inclined surface 29. The light-shielding material can be, for example, black resin such as black matrix or a metal material.

Consequently, in recesses each of which is positioned between adjacent ones of the light-shielding layers 50 provided on the inclined surface 29, regions through which infrared light is transmitted are provided in the form of slits. Namely, the inclined surface 29 of the protection plate 18 is provided with (i) regions (light-shielding sections) each of which is made of the light-shielding layer 50 and through which infrared light is not transmitted and (ii) regions 51 (hereinafter, referred to as "slits") through which infrared light is transmitted, the regions serving as the light-shielding sections and the regions 51 being arranged alternately.

According to the present embodiment, infrared light emitted from an infrared light source 1 so as to enter the inclined surface 29 is emitted from the slits 51, which are provided on the inclined surface 29. At this time, at an interface between the protection plate 18 and an air layer which interface is in the slits 51, the infrared light emitted from the slits 51 is diffracted by the slits 51 provided on the protection plate 18, and is refracted by a refractive index of the protection plate 18 with respect to the air. Consequently, a light path of the infrared light is changed. Namely, in the present embodiment, the infrared ray emitting section provided on the surface of the protection plate 18, particularly, the inclined surface 29 serves as a light path changing section.

Also in the present embodiment, an angle of incidence θ of infrared light with respect to the inclined surface 29 is preferably set so that infrared light transmitted through the protection plate 18 is refracted by the inclined surface 29 so as to be converted into light which is in parallel with the touch surface 20.

Therefore, the angle of incidence θ preferably satisfies the following formula (2):

$$\theta = \arcsin((\sin(\arcsin(k) - \theta_0) - m \cdot \lambda_2 / P) / n) \quad (2),$$

where, for example, n denotes a relative refractive index of the protection plate 18 with respect to an absolute refractive index of the air, $\theta_0$ denotes an angle by which the inclined surface 29 is inclined with respect to the touch surface 20, $\lambda_2$ denotes a wavelength of infrared light emitted along the surface of the protection plate 18, P denotes a distance (hereinafter, referred to as a "slit pitch") between centers of adjacent ones of the slits 51, k is 0.975 or greater and not greater than 1, and m is an integer of 0 or greater. Note that, in the formula (2), m denotes the order of diffraction.

In other words, the inclined surface 29 is preferably provided with the light-shielding sections so that the formula (2) is satisfied. In still other words, the slit pitch P is preferably set so that the formula (2) is satisfied.

Also in the formula (2), k is a value used to determine a range of the angle of incidence θ. In a case where k=1, a desired angle of incidence is obtained. Also in this case, by changing k in a range from 0.975 to 1, it is possible to adjust the angle of incidence θ in a range of ±4 degrees.

With this, the infrared light entered the inclined surface 29 can be converted into light which is in parallel with the touch surface 20. This makes it possible to efficiently emit the infrared light to the touch surface 20. Therefore, the present embodiment can provide the same effects as those given by Embodiment 2.

Further, providing, on the inclined surface 29, the slits 51 and the light-shielding layers 50 alternately as in the present embodiment can make θ smaller. Accordingly, it is possible to reduce loss caused by interface reflection, thereby enabling to improve diffraction efficiency.

As well as in Embodiments 1 and 2, in the present embodiment, the infrared light sources 1 may be provided along sides of the touch surface 20, or may be provided in corner sections of the touch surface 20.

The descriptions of the present embodiment has dealt with an example where, as shown in FIG. 10, (i) the housing section 28, which is hollow, is provided on the side of the back surface of the protection plate 18 so as to cover the side surface of the liquid crystal panel 10, and (ii) the infrared light source 1 is integrated in the housing section 28. However, the present embodiment is not limited to this. The housing section 28 is not necessarily essential. As long as the angle of incidence θ satisfies Formula (2), the infrared light source 1 may be provided so as to face the region which is on the side of the back surface of the protection plate 18 and is in the outside of the touch region. Namely, as well as Embodiment 2, the present embodiment may employ, as a modification, any of the configurations shown in (a) through (c) of FIG. 9 in which the protection plate 15 and the housing section 25 are replaced with the protection plate 18 and the housing section 28, respectively.

The position of the infrared light source 1, the materials of the protection plate 18 and the housing section 28, and combinations thereof are not limited to the above configuration, as long as the angle of incidence θ satisfies Formula (2).

Embodiment 4

Next, the following will describe still further another embodiment of the present invention with reference to FIG. 11. Descriptions of the present embodiment deal with differences between (i) the present embodiment and (ii) Embodiments 1 through 3. Further, constituent elements having the same functions as those explained in Embodiments 1 through 3 are given the same signs as Embodiments 1 through 3, and explanations thereof are omitted here.

FIG. 11 is a cross-section view schematically illustrating a configuration of a main part of a liquid crystal display device of the still further another embodiment of the present invention. Further, FIG. 11 shows enlarged views of parts surrounded by dotted lines.

The present embodiment differs from Embodiments 1 through 3 in the following points: A protection plate (infrared light transmitting material) 19 is provided on a liquid crystal panel 10, infrared light sources 1 are provided below the protection plate 19, and a light guide plate (light guide member) 23 having a reflection surface (light path changing section) 22 is provided on the protection plate 18.

In the present embodiment, as shown in FIG. 11, the protection plate 19 is provided on the side of a touch surface 20 of a liquid crystal panel 10. Therefore, a surface of the protection plate 19 serves as the touch surface 20.

The protection plate 19 is extended to and provided in an outside of a touch region of the liquid crystal panel 10. The protection plate 19 may be made of the same material as that of the protection plate 15 of Embodiment 2.

The infrared light sources 1 are provided in the outside of the touch region and below the protection plate 19. Further, each of the infrared light sources 1 is provided along a direction which allows the infrared light source 1 to emit infrared light entering a lower surface of the protection plate 19 at right angle.

Further, on a part of the protection plate 19 which part is in the outside of the touch region, there provided the light guide plate 23 having the reflection surface 22. The reflection surface 22 is a surface for reflecting infrared light so that the infrared light is converted into light which is in parallel with a surface of the protection plate 19, i.e., the touch surface 20. The light guide plate 23 is a plate for guiding, to the touch surface 20, the infrared light thus converted by the reflection surface 22. Note that the light guide plate 23 having the reflection surface 22 may be, for example, a light guide plate having a 45° mirror such as a right angle prism. However, the present embodiment is not limited to this. The light guide plate 23 is not particularly limited, as long as it has the reflection surface 22.

According to the present embodiment, as shown in FIG. 11, infrared light emitted by the infrared light sources 1 enters the lower surface of the protection plate 19 at right angle, travels inside the protection plate 19 without being refracted, and then enters an upper surface of the protection plate 19 at right angle. Thereafter, the infrared light emitted from the surface of the protection plate 19 is reflected by the reflection surface 22 of the light guide plate 23 provided on the protection plate 19, and then is converted into light which is in parallel with the surface of the protection plate 19, i.e., the touch surface 20. Furthermore, the infrared light is guided to the touch surface 20 by the light guide plate 23. Thus, it is possible to emit infrared light to the touch surface 20 efficiently.

Note that the present embodiment is not limited to the above-described embodiment. Alternatively, for example, the following configuration is possible: Infrared light is caused to enter the protection plate 19 at a slant, and then to be refracted and emitted from the surface of the protection plate 19. Thereafter, the infrared light is converted by the reflection surface 22 into light which is in parallel with the touch surface 20.

As well as in Embodiment 1, in the present embodiment, infrared light is emitted in parallel with the touch surface 20 and toward an upper position of the touch surface 20. Consequently, it is possible to obtain a characteristic loop-like image in which (i) a part touched by a detection subject such as a finger is dark and (ii) the surroundings of the touched part are light. As a result, it is possible to capture the contour (shape) of the detection subject from a lower position. Therefore, it is possible to identify, e.g., a center position of the finger. Further, since infrared light is emitted along the touch surface 20 so as to be in parallel with the touch surface 20, a difference between (i) a signal obtained in a touched state and (ii) a signal obtained in a non-touched state becomes great. Consequently, it is possible to recognize the difference clearly. This makes it possible to accurately detect a position of a detection subject, and also to detect a plurality of detection subjects at once.

Further, also in the present embodiment, since the infrared light source 1 is provided below the protection plate 19, it is possible to reduce the entire thickness of the liquid crystal display device. Further, since wiring of the infrared light source 1 does not protrude in a plane direction (horizontal direction), it is also possible to reduce the size of the liquid crystal display device.

The present invention is not limited to the description of the embodiments above, but may be altered by a skilled person within the scope of the claims. An embodiment based on a proper combination of technical means disclosed in different embodiments is encompassed in the technical scope of the present invention.

For example, a touch panel of the present embodiment is preferably configured such that: each of the infrared light sensors further includes an optical filter for shielding a respective one of the infrared light receiving elements from visible light.

According to the above configuration, the infrared light receiving element included in the infrared light sensor can receive light after the optical filter blocks visible light. This provides the infrared light sensor which is capable of accurately determining an intensity of received infrared light.

Further, a touch panel of the present invention is preferably configured such that: a light path changing section is provided in the outside of the touch region, the light path changing section changing a light path of infrared light emitted by the infrared light sources so that the light path becomes in parallel with said surface of the infrared light transmitting material.

According to the above configuration, since the light path changing section is provided, it is not necessary to provide the infrared light source on the infrared light transmitting material. This improves flexibility in positioning the infrared light source. Particularly, according to the above configuration, it is possible to provide the infrared light source below the infrared light transmitting material as described later. Consequently, the touch region and a region outside of the touch region, each of which is in the touch panel, can be designed so as to be flat.

Further, the above touch panel is preferably configured such that: the infrared light transmitting material includes an extension section which is extended from the infrared light transmitting material and is provided in the outside of the touch region; the extension section has a surface which is on the side of the touch surface, the surface being provided with the light path changing section having an inclined surface which is inclined with respect to the touch surface; the infrared light is emitted to the inclined surface; and the following formula (1) is satisfied:

$$\theta = \arcsin[n \cdot \sin\{\arcsin(k) - \theta_0\}] \quad (1),$$

where n denotes a relative refractive index of the infrared light transmitting material with respect to an absolute refractive index of air, $\theta_0$ denotes an angle by which the inclined surface is inclined with respect to the touch surface, θ denotes an angle of incidence of infrared light with respect to the inclined surface, and k is 0.975 or greater and not greater than 1.

Further, the above touch panel is further preferably configured such that: the infrared light transmitting material includes an extension section which is extended from the infrared light transmitting material and is provided in the outside of the touch region; the extension section has a surface which is on the side of the touch surface, the surface being provided with the light path changing section having an inclined surface which is inclined with respect to the touch surface; the infrared light is emitted to the inclined surface, and the inclined surface is provided with (i) first regions through which infrared light is transmitted and (ii) second regions through which infrared light is not transmitted, the first regions and the second regions being arranged alternately; and the following formula (2) is satisfied:

$$\theta = \arcsin((\sin(\arcsin(k)) - \theta_0) - m \cdot \lambda_2/P)/n) \quad (2),$$

where n denotes a relative refractive index of the infrared light transmitting material with respect to an absolute refractive index of air, $\theta_0$ denotes an angle by which the inclined surface is inclined with respect to the touch surface, $\lambda_2$ denotes a wavelength of infrared light emitted along the surface of the infrared light transmitting material, θ denotes an angle of incidence of infrared light with respect to the inclined surface, P denotes a distance between centers of adjacent ones of the first regions, k is 0.975 or greater and not greater than 1, and m is an integer of 0 or greater.

According to each of the above configurations, infrared light emitted by the infrared light source can be refracted at the surface of the infrared light transmitting material so as to become light which is in parallel with the surface. Thus, according to each of the above configurations, light emitted to a surface of a part of the infrared light transmitting material which part is extended to and provided in the outside of the touch region can be converted, at the surface of the infrared light transmitting material, into light which is in parallel with the touch surface.

Further, according to each of the above configurations, it is possible to emit infrared light only to an interface between the infrared light transmitting material and an air layer. Consequently, it is possible to increase a difference between (i) a signal obtained in a touched state and (ii) a signal obtained in a non-touched state.

At this time, by providing, in the inclined surface, (i) the first regions through which infrared light is transmitted and (ii) the second regions through which infrared light is not transmitted such that the first regions and the second regions are arranged alternately particularly as in the latter of the above-described configurations, it is possible to make θ smaller. Thus, employing the latter of the above-described configurations can reduce loss caused by interface reflection, thereby improving diffraction efficiency.

Further, the above touch panel is preferably configured such that: a reflection member is provided so as to surround each of the infrared light sources, the reflection member reflecting infrared light emitted by the infrared light source so as to guide the infrared light to said surface of the infrared light transmitting material, the reflection member being provided so as to be adjacent to a surface of a part of the infrared light transmitting material which part is extended to and provided in the outside of the touch region; and the infrared light transmitting material and the reflection member serve as the light path changing section.

According to the above configuration, it is possible (i) to prevent infrared light emitted from the infrared light sources from being scattered to its surroundings, and (ii) to efficiently emit infrared light to the surface of the part of the infrared light transmitting material which part is extended to and provided in the outside of the touch region. Further, it is possible to eliminate or reduce the possibility of such a case where emitted infrared light is reflected by the infrared light transmitting material and is propagated through the infrared light transmitting material. Thus, according to the above configuration, it is possible to efficiently emit, to a space above the infrared light transmitting material, light which is in parallel with the surface of the infrared light transmitting material.

Further, the touch panel of the present invention is preferably configured such that: the infrared light sources are provided below the touch surface of the infrared light transmitting material.

According to the above configuration, in a case where the touch panel is mounted in (stacked on) a display device such as a liquid crystal display device, it is possible to reduce the entire thickness of the device. Further, since wiring of the infrared light source does not protrude in a plane direction (horizontal direction), it is possible to reduce the size of the device.

Further, the touch panel of the present invention is preferably configured such that: a light guide member through which infrared light is transmitted is provided in the outside of the touch region of the infrared light transmitting material; and the light guide member has a reflection surface serving as the light path changing section.

According to the above configuration, infrared light emitted from the infrared light source to the light guide member can be emitted from the light guide member so as to be in parallel with the surface of the infrared light transmitting material.

Further, the touch panel of the present invention is preferably configured such that: the infrared light sources are positioned so as to face corner sections of the touch region.

According to the above configuration, as compared with a configuration in which infrared light sources are provided so as to face each other in sides constituting the outer periphery of the touch region, it is possible to reduce the number of infrared light sources, thereby reducing electric power consumption.

A liquid crystal panel of the present invention includes any of the above-described touch panels.

According to the above configuration, by employing any of the above-described touch panels, it is possible to provide a liquid crystal panel including a touch panel capable of (i) detecting an input position with higher accuracy under a broader range of environmental illuminance and (ii) detecting three or more input positions at once. Further, since infrared light is used for detection in the above configuration, it is possible to provide a liquid crystal panel which does not cause impairment in display quality and visibility.

A liquid crystal display device of the present invention includes the above-described liquid crystal panel.

According to the above configuration, by employing the above-described liquid crystal panel, it is possible to provide a liquid crystal display device including a liquid crystal panel including a touch panel capable of (i) detecting an input position with higher accuracy under a broader range of environmental illuminance and (ii) detecting three or more input positions at once. Further, since infrared light is used for detection in the above configuration, it is possible to provide a liquid crystal display device including a liquid crystal panel which does not cause impairment in display quality and visibility.

Further, a touch panel-integrated liquid crystal display device of the present invention includes any of the above-described touch panels, the infrared light transmitting material being one of a pair of substrates included in a liquid crystal panel, the liquid crystal panel including a liquid crystal layer sandwiched by the substrates.

According to the above configuration, by employing the above-described touch panel, it is possible to provide a touch panel-integrated liquid crystal display device capable of (i) detecting an input position with higher accuracy under a broader range of environmental illuminance and (ii) detecting three or more input positions at once. Further, since infrared light is used for detection in the above configuration, it is possible to provide a touch panel-integrated liquid crystal display device which does not cause impairment in display quality and visibility.

Example

Here, as an Example, the one which has the same configuration as that of the touch panel-integrated liquid crystal display device of the above-described Embodiment 1 was used. Namely, used as the Example was a touch panel employing a method (side light method) according to which infrared light is emitted from the outside of a touch region so as to be in parallel with a touch surface 20, and light reflected by a detection subject is detected by an area sensor 3 provided below the touch surface 20.

Further, as a Comparative Example, a conventionally-used touch panel-integrated liquid crystal display device was used. This conventionally-used touch panel employed a method (backlight method) which utilizes light from a backlight of a liquid crystal panel. Specifically, according to this conventionally-used touch panel, light from the backlight is reflected by a detection subject, and the reflection light is detected.

The results of comparison in detection accuracy between the Example and the Comparative Example are described with reference to FIG. 12 through (a) and (b) of FIG. 14. FIG. 12 is a graph showing differences between (i) signal levels observed when the touch surface 20 was touched by a detection subject and (ii) signal levels observed when the touch surface 20 was not touched by the detection subject, which differences were observed under different environmental illuminances according to the Example of the present invention.

As shown in FIG. 12, in the range from 0 to 10000 lux (lx), under each of the environmental illuminances, a difference (8 bits) between (i) the signal level observed in the touched state and (ii) the signal level observed in the non-touched state of the touch panel of the Example was 15- to 30-times greater than that of the touch panel of the Comparative Example. This shows that the touch panel of the Example distinguished between the touched state and the non-touched state with higher accuracy, as compared with the touch panel employing the conventionally-used backlight method.

Next, FIG. 13 shows (i) an image obtained in a touched state and (ii) an image obtained in a non-touched state, each of which image was obtained in a case of using the touch panel of the Example. FIG. 13 is a view showing the images obtained with the touch panel of the Example of the present invention. Note that the tip of a finger was used as a detection subject.

The finger, which served as the detection subject, was caused to touch the touch surface 20, in order to examine an image obtained by an area sensor 3. As a result, as shown in FIG. 13, a photo sensor element 4 in the area sensor 3 detected light reflected by the finger, so that a characteristic loop-like image (A) in which (i) a part of the touch surface which part was touched by the finger was dark and (ii) the surroundings of the touched part were light.

Thus, according to the touch panel of the Example, since infrared light is emitted from the surroundings of the touch region, a characteristic loop-like image in which (i) a part touched by the detection subject is dark and (ii) the surroundings of the touched part are light is obtained. This makes it easier to identify, e.g., a center position of the detection subject, thereby making it possible to detect the touched position with higher accuracy. Further, since infrared light is emitted along the touch surface 20, it is possible to more clearly recognize (i) a touched state or (ii) a non-touched state. Furthermore, it was shown that the touch panel of the Example could detect even a light touch made by the detection subject. This shows that the touch panel of the Example is operable by a quite light touch.

Further, comparison was made between the Example and the Comparative Example in terms of detection accuracy under strong parallel light. The results of the comparison are shown in (a) and (b) of FIG. 14. (a) and (b) of FIG. 14 are views showing images of a detection subject which images were obtained under parallel light according to the Example of the present invention. Note that, as the parallel light, direct sun light of 85000 lux was used. As the detection subject, the tip of a finger was used.

As shown in (a) of FIG. 14, according to the touch panel of the Comparative Example, a difference in characteristics was hardly observed between (i) an image obtained in a touched state and (ii) an image obtained in a non-touched state. On the other hand, as shown in (b) of FIG. 14, according to the touch panel of the Example, a white loop was observed (at the position indicated by "+" in (b) of FIG. 14) in an image of the detection subject obtained in the touched state, whereas such a characteristic white loop was not observed in an image obtained in the non-touched state. This shows that the touch panel of the Example is capable of distinguishing between a touched state and a non-touched state even under strong parallel light.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

A touch panel, a liquid crystal panel, a liquid crystal display device, and a touch panel-integrated liquid crystal display device of the present invention are each capable of (i) detecting an input position with higher accuracy under a broader range of environmental illuminance and (ii) detecting three or more input positions at once. The present invention is applicable to a display device including a touch panel, a mobile phone including a display screen having a touch panel function, a display device such as a PC, etc.

REFERENCE SIGNS LIST

1 Infrared light source
2 Light path
3 Area sensor (infrared light sensor)
4 Photo sensor element (infrared light receiving element)
5 Optical filter 6 Reflection light
10 Liquid crystal panel
11 Active matrix substrate
12 Counter substrate
13 Liquid crystal layer
14 Backlight
15 Protection plate (infrared light transmitting material)
16 Front polarizing plate
17 Rear polarizing plate
18 Protection plate (infrared light transmitting material)
19 Protection plate (infrared light transmitting material)
20 Touch surface
21 Reflection member
22 Reflection surface (light path changing section)
23 Light guide plate (light guide member)
25 Housing section
26 Inclined surface
28 Housing section
29 inclined surface
30 Area sensor control section
31 Timing generating circuit
32 Area sensor driving circuit
33 Area sensor reading circuit
34 Coordinates extracting circuit
35 Interface circuit
40 Liquid crystal driving circuit
50 Light-shielding layer
51 Slit (region through which infrared light is transmitted)
θ Angle of incidence
P Slit pitch

The invention claimed is:

1. A touch panel comprising:
an infrared light transmitting material through which infrared light is transmitted and which has a surface being used as a touch surface, the touch surface being touched by a detection subject;
infrared light sensors including a plurality of infrared light receiving elements provided below a touch region of the infrared light transmitting material, the touch region being touched by the detection subject; and
a plurality of infrared light sources provided in an outside of the touch region of the infrared light transmitting material, the plurality of infrared light sources being configured to emit infrared light along said surface of the infrared light transmitting material such that an entire circumference of the detection subject touching the touch surface is irradiated with the infrared light,
the touch panel detecting a position touched by the detection subject in such a manner that at least one of the infrared light sensors receives, among infrared light emitted by the infrared light sources along said surface of the infrared light transmitting material, infrared light which is reflected by the detection subject and is transmitted through the infrared light transmitting material,
wherein:
a light path changing section is provided in the outside of the touch region, the light path changing section changing a light path of infrared light emitted by the infrared light sources so that the light path becomes in parallel with said surface of the infrared light transmitting material,
wherein:
the infrared light transmitting material includes an extension section which is extended from the infrared light transmitting material and is provided in the outside of the touch region;
the extension section has a surface which is on the side of the touch surface, the surface being provided with the light path changing section having an inclined surface which is inclined with respect to the touch surface;
the infrared light is emitted to the inclined surface; and
the following formula (1) is satisfied:

$$\theta = \arcsin[n \cdot \sin\{\arcsin(k) - \theta_0\}] \quad (1),$$

where n denotes a relative refractive index of the infrared light transmitting material with respect to an absolute refractive index of air, $\theta_0$ denotes an angle by which the inclined surface is inclined with respect to the touch surface, θ denotes an angle of incidence of infrared light with respect to the inclined surface, and k is 0.975 or greater and not greater than 1.

2. The touch panel as set forth in claim 1, wherein:
each of the infrared light sensors further includes an optical filter for shielding a respective one of the infrared light receiving elements from visible light.

3. The touch panel as set forth in claim 1, wherein:
a reflection member is provided so as to surround each of the infrared light sources, the reflection member reflecting infrared light emitted by the infrared light source so as to guide the infrared light to said surface of the infrared light transmitting material, the reflection member being provided so as to be adjacent to a surface of a part of the infrared light transmitting material which part is extended to and provided in the outside of the touch region; and
the infrared light transmitting material and the reflection member serve as the light path changing section.

4. The touch panel as set forth in claim 1, wherein:
the infrared light sources are provided below the touch surface of the infrared light transmitting material.

5. The touch panel as set forth in claim 1, wherein:
the infrared light sources are positioned so as to face corner sections of the touch region.

6. A liquid crystal display device comprising a liquid crystal panel which comprises a touch panel as set forth in claim 1.

7. A touch panel-integrated liquid crystal display device, comprising:
a touch panel as set forth in claim 1,
the infrared light transmitting material being one of a pair of substrates included in a liquid crystal panel, the liquid crystal panel including a liquid crystal layer sandwiched by the substrates.

8. A touch panel comprising:
an infrared light transmitting material through which infrared light is transmitted and which has a surface being used as a touch surface, the touch surface being touched by a detection subject;
infrared light sensors including a plurality of infrared light receiving elements provided below a touch region of the infrared light transmitting material, the touch region being touched by the detection subject; and
a plurality of infrared light sources provided in an outside of the touch region of the infrared light transmitting material, the plurality of infrared light sources being configured to emit infrared light along said surface of the infrared light transmitting material such that an entire circumference of the detection subject touching the touch surface is irradiated with the infrared light,
the touch panel detecting a position touched by the detection subject in such a manner that at least one of the infrared light sensors receives, among infrared light emitted by the infrared light sources along said surface of the infrared light transmitting material, infrared light which is reflected by the detection subject and is transmitted through the infrared light transmitting material, wherein:
a light path changing section is provided in the outside of the touch region, the light path changing section changing a light path of infrared light emitted by the infrared light sources so that the light path becomes in parallel with said surface of the infrared light transmitting material, wherein:
the infrared light transmitting material includes an extension section which is extended from the infrared light transmitting material and is provided in the outside of the touch region;
the extension section has a surface which is on the side of the touch surface, the surface being provided with the light path changing section having an inclined surface which is inclined with respect to the touch surface;
the infrared light is emitted to the inclined surface, and the inclined surface is provided with (i) first regions through which infrared light is transmitted and (ii) second regions through which infrared light is not transmitted, the first regions and the second regions being arranged alternately; and
the following formula (2) is satisfied:

$$\theta = \arcsin((\sin(\arcsin(k) - \theta_0) - m \cdot \lambda_2/P)/n) \quad (2),$$

where n denotes a relative refractive index of the infrared light transmitting material with respect to an absolute refractive index of air, $\theta_0$ denotes an angle by which the inclined surface is inclined with respect to the touch surface, $\lambda_2$ denotes a wavelength of infrared light emitted along the surface of the infrared light transmitting material, $\theta$ denotes an angle of incidence of infrared light with respect to the inclined surface, P denotes a distance between centers of adjacent ones of the first regions, k is 0.975 or greater and not greater than 1, and m is an integer of 0 or greater.

9. The touch panel as set forth in claim 8, wherein:
each of the infrared light sensors further includes an optical filter for shielding a respective one of the infrared light receiving elements from visible light.

10. The touch panel as set forth in claim 8, wherein:
a reflection member is provided so as to surround each of the infrared light sources, the reflection member reflecting infrared light emitted by the infrared light source so as to guide the infrared light to said surface of the infrared light transmitting material, the reflection member being provided so as to be adjacent to a surface of a part of the infrared light transmitting material which part is extended to and provided in the outside of the touch region; and
the infrared light transmitting material and the reflection member serve as the light path changing section.

11. The touch panel as set forth in claim 8, wherein:
the infrared light sources are provided below the touch surface of the infrared light transmitting material.

12. The touch panel as set forth in claim 8, wherein:
the infrared light sources are positioned so as to face corner sections of the touch region.

13. A liquid crystal display device comprising a liquid, crystal panel which comprises a touch panel as set forth in claim 8.

14. A touch panel-integrated liquid crystal display device, comprising:
a touch panel as set forth in claim 8,
the infrared light transmitting material being one of a pair of substrates included in a liquid crystal panel, the liquid crystal panel including a liquid crystal layer sandwiched by the substrates.

15. A touch panel comprising:
an infrared light transmitting material through which infrared light is transmitted and which has a surface being used as a touch surface, the touch surface being touched by a detection subject;
infrared light sensors including, a plurality of infrared light receiving elements provided below a touch region of the infrared light transmitting material, the touch region being touched by the detection subject; and
a plurality of infrared light sources provided in an outside of the touch region of the infrared light transmitting material, the plurality of infrared light sources being configured to emit infrared light along said surface of the infrared light transmitting material such that an entire circumference of the detection subject touching the touch surface is irradiated with the infrared light,
the touch panel detecting a position touched by the detection subject in such a manner that at least one of the infrared light sensors receives, among infrared light emitted by the infrared light sources along said surface of the infrared light transmitting material, infrared light which is reflected by the detection subject and is transmitted through the infrared light transmitting material,
wherein:
a light path changing section is provided in the outside of the touch region, the light path changing section changing a light path of infrared light emitted by the infrared light sources so that the light path becomes in parallel with said surface of the infrared light transmitting material,
wherein:
a light guide member through which infrared light is transmitted is provided in the outside of the touch region of the infrared light transmitting material; and
the light guide member has a reflection surface serving as the light path changing section.

16. The touch panel as set forth in claim 15, wherein:
each of the infrared light sensors further includes an optical filter for shielding a respective one of the infrared light receiving elements from visible light.

17. The touch panel as set forth in claim 15, wherein:
the infrared light sources are positioned so as to face corner sections of the touch region.

18. A liquid crystal display device comprising a liquid crystal panel which comprises a touch panel as set forth in claim 15.

19. A touch panel-integrated liquid crystal display device, comprising:
a touch panel as set forth in claim 15,
the infrared light transmitting material being one of a pair of substrates included in a liquid crystal panel, the liquid crystal panel including a liquid crystal layer sandwiched by the substrates.

* * * * *